(12) United States Patent
Dai et al.

(10) Patent No.: US 12,321,035 B2
(45) Date of Patent: Jun. 3, 2025

(54) CONTROL METHOD FOR SHAPE MEMORY ALLOY MOTOR IN PHOTOGRAPHING APPARATUS AND PHOTOGRAPHING APPARATUS

(71) Applicant: Huawei Technologies Co., Ltd., Shenzhen (CN)

(72) Inventors: Jiazhi Dai, Shanghai (CN); Chuan Yang, Dongguan (CN); Feng Gao, Shanghai (CN); Huogen Kuang, Shanghai (CN); Takao Ishii, Yokohama (JP)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 772 days.

(21) Appl. No.: 17/595,105

(22) PCT Filed: Feb. 26, 2020

(86) PCT No.: PCT/CN2020/076705
§ 371 (c)(1),
(2) Date: Nov. 9, 2021

(87) PCT Pub. No.: WO2020/228392
PCT Pub. Date: Nov. 19, 2020

(65) Prior Publication Data
US 2022/0196967 A1  Jun. 23, 2022

(30) Foreign Application Priority Data

May 10, 2019 (CN) .......................... 201910388440.1
Sep. 10, 2019 (CN) .......................... 201910853837.3

(51) Int. Cl.
G02B 7/09 (2021.01)
G02B 27/64 (2006.01)

(52) U.S. Cl.
CPC ............. *G02B 7/09* (2013.01); *G02B 27/646* (2013.01)

(58) Field of Classification Search
CPC .................................. G02B 7/09; G02B 27/646
(Continued)

(56) References Cited

U.S. PATENT DOCUMENTS

2006/0198624 A1  9/2006  Ono et al.
2017/0251303 A1  8/2017  Lesso et al.
(Continued)

FOREIGN PATENT DOCUMENTS

CN  101416090 A  4/2009
CN  101567641 A  10/2009
(Continued)

OTHER PUBLICATIONS

Meng, B. et al., "Research Process of Electro—fllechanical Converter for Electro-hydraulic Servo /Proportional Valve", Machine Tool and Hydraulics, vol. 40 No. 7, Apr. 2012, 6 pages.

*Primary Examiner* — Stephone B Allen
*Assistant Examiner* — Leonidas Boutsikaris
(74) *Attorney, Agent, or Firm* — Slater Matsil, LLP

(57) ABSTRACT

A photographing apparatus includes a shape memory alloy (SMA) motor, an image sensor, a lens, and a controller. The SMA motor includes an SMA wire. The SMA wire is configured to deform to drive the lens to move. The controller is configured to output a pulse signal. The pulse signal includes a drive signal and a detection signal. The drive signal is used to cause the SMA wire to deform. The detection signal is used to detect deformation of the SMA wire. N times a pulse signal cycle is equal to a time difference between the first time of sampling and the second time of sampling in correlated double sampling of the image sensor.

9 Claims, 14 Drawing Sheets

(58) Field of Classification Search
USPC .......................................................... 359/822
See application file for complete search history.

(56) References Cited

U.S. PATENT DOCUMENTS

| | | | |
|---|---|---|---|
| 2018/0055495 A1 | 3/2018 | Tehrani et al. | |
| 2020/0271946 A1* | 8/2020 | Howarth | G02B 27/646 |
| 2022/0106941 A1* | 4/2022 | Easton | F03G 7/066 |

FOREIGN PATENT DOCUMENTS

| | | |
|---|---|---|
| CN | 102340629 A | 2/2012 |
| CN | 103124919 A | 5/2013 |
| CN | 103412039 A | 11/2013 |
| CN | 205427170 U | 8/2016 |
| CN | 107291218 A | 10/2017 |
| CN | 107409183 A | 11/2017 |
| CN | 108232440 A | 6/2018 |
| CN | 108292077 A | 7/2018 |
| CN | 108572355 A | 9/2018 |
| EP | 2088766 A1 | 8/2009 |
| JP | 2005277709 A | 10/2005 |
| JP | 2012159046 A | 8/2012 |
| JP | 2016097151 A | 5/2016 |
| KR | 20080107476 A | 12/2008 |
| KR | 20090086170 A | 8/2009 |
| KR | 20150057786 A | 5/2015 |
| KR | 20180061236 A | 6/2018 |
| WO | 2007113478 A1 | 10/2007 |
| WO | 2011145463 A1 | 11/2011 |
| WO | 2013186725 A2 | 12/2013 |
| WO | 2017055788 A1 | 4/2017 |
| WO | 2018015762 A1 | 1/2018 |

\* cited by examiner

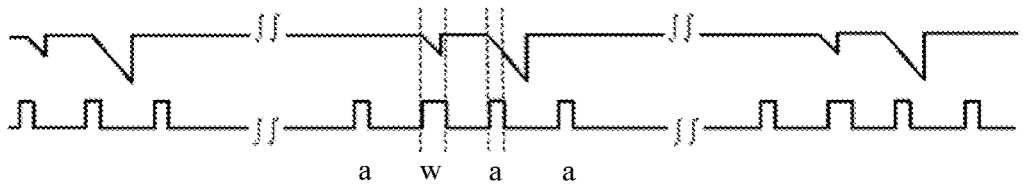

FIG. 15

S1201: A controller outputs a first detection signal in a first time, where the first time corresponds to the first time of sampling S1202: The controller outputs a second detection signal in a second time, where a pulse width of the second detection signal is equal to a pulse width of the first detection signal, the second time corresponds to the second time of sampling, and a detection signal includes the first detection signal and the second detection signal

FIG. 16

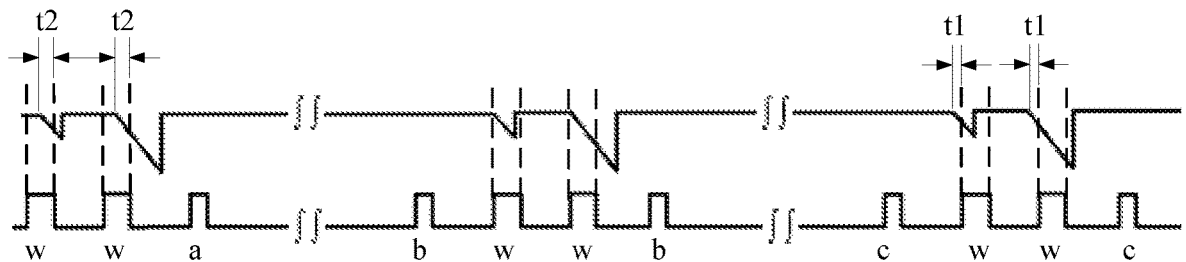

FIG. 17

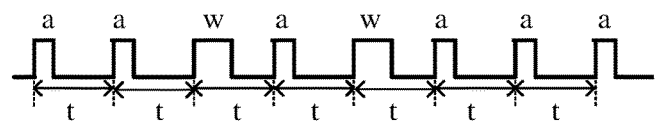

FIG. 18

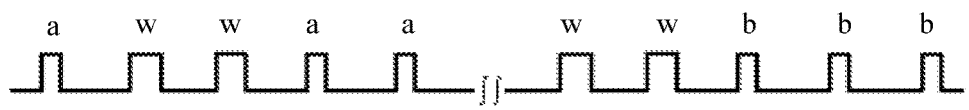

FIG. 19

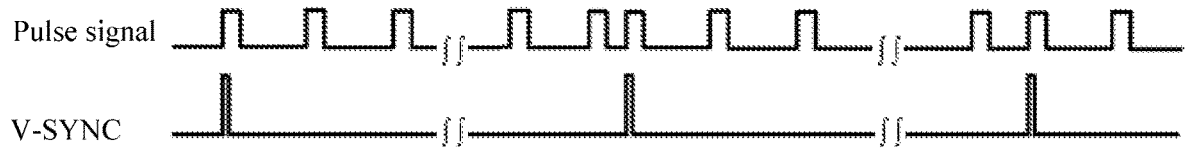

FIG. 20

S1601: A controller outputs a first drive signal, where a drive signal includes the first drive signal S1602: The controller outputs a first detection signal, where a width of the first detection signal is equal to a width of the drive signal, the first detection signal is a signal in a preset time range before or after the first drive signal, and a detection signal includes the first detection signal

FIG. 21

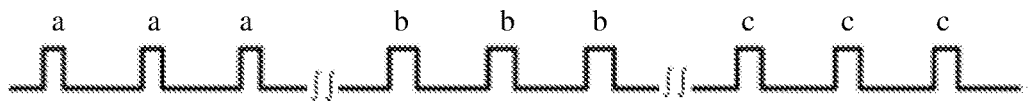

FIG. 22

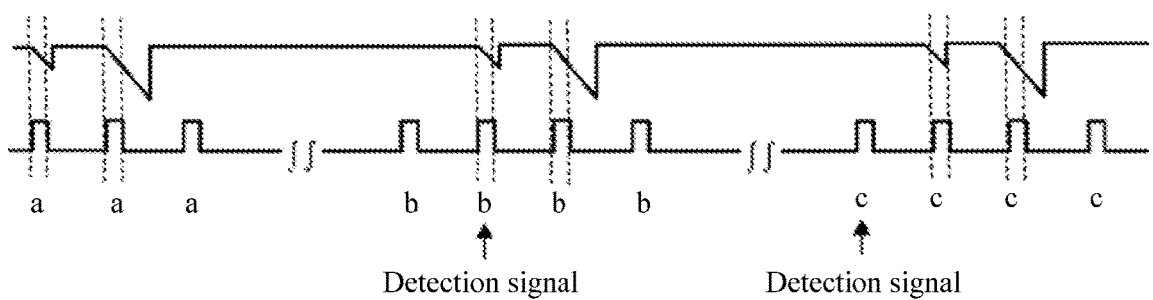

FIG. 23

CONTROL METHOD FOR SHAPE MEMORY ALLOY MOTOR IN PHOTOGRAPHING APPARATUS AND PHOTOGRAPHING APPARATUS

CROSS-REFERENCE TO RELATED APPLICATIONS

This application is a national stage of International Application No. PCT/CN2020/076705, filed on Feb. 26, 2020, which claims priority to Chinese Patent Application No. 201910388440.1, filed on May 10, 2019, and Chinese Patent Application No. 201910853837.3, filed on Sep. 10, 2019. All of the aforementioned applications are hereby incorporated by reference in their entireties.

TECHNICAL FIELD

This application relates to the field of lens driving apparatuses, and in particular, to a control method for a shape memory alloy motor in a photographing apparatus and a photographing apparatus.

BACKGROUND

Auto focus (auto focus, AF) means that according to a principle of light reflection of a photographed object, an image is formed on an image sensor after light reflected by the photographed object passes through a lens, and a computer obtains an object distance of the photographed object by processing the image generated by the image sensor, and then automatically moves the lens based on the object distance to complete focus adjustment.

To compensate for image blur caused by shaking of a terminal device during exposure, an optical image stabilization (optical image stabilization, OIS) technology is proposed. A gyroscope performs shaking detection, and then the entire lens is horizontally moved in a reverse direction or is rotated by using an OIS motor, to compensate for the image blur caused by shaking of the terminal device during exposure.

In a method for implementing AF and OIS above, a motor component may be used to drive the lens to move or rotate. As a type of the foregoing motor component, a shape memory alloy (shape memory alloy, SMA) motor is small in size and has a strong driving capability, and is used in a photographing apparatus. However, there are noise stripes in an image generated by an image sensor in the photographing apparatus using the SMA motor.

SUMMARY

This application provides a control method for a shape memory alloy SMA motor in a photographing apparatus, a control apparatus, and a photographing apparatus, to reduce or eliminate noise stripes in a generated image.

According to a first aspect, a control method for a shape memory alloy SMA motor in a photographing apparatus is provided. The photographing apparatus includes the SMA motor, an image sensor, a lens, and a controller, the SMA motor includes at least one SMA wire, the at least one SMA wire is configured to deform to drive the lens to move, the controller is configured to output a pulse signal, the pulse signal includes a drive signal and a detection signal, the drive signal is used to cause a first SMA wire in the at least one SMA wire to deform, the detection signal is used to detect deformation of the first SMA wire, N times a pulse signal cycle is equal to a time difference between the first time of sampling and the second time of sampling in correlated double sampling CDS of the image sensor, and N is a positive integer. The method includes: The controller outputs a first detection signal in a first time, where the first time corresponds to the first time of sampling; and the controller outputs a second detection signal in a second time, where a pulse width of the second detection signal is equal to a pulse width of the first detection signal, the second time corresponds to the second time of sampling, and the detection signal includes the first detection signal and the second detection signal.

The two detection signals with equal widths are output in time periods corresponding to two times of sampling in the correlated double sampling of the image sensor, so that interference caused by the detection signals to the two times of sampling is basically equal. In this way, noise stripes in an image generated by the image sensor are eliminated.

With reference to the first aspect, in some possible implementations, one analog-to-digital conversion ADC cycle of the image sensor corresponds to one time of CDS, a detection cycle of the detection signal is equal to a positive integer multiple of the ADC cycle, and one detection cycle corresponds to output of two detection signals.

The detection cycle for outputting the detection signal is set, so that the detection cycle of the detection signal is equal to the positive integer multiple of the ADC cycle. In this way, a difficulty in designing a time sequence of the pulse signal is reduced.

With reference to the first aspect, in some possible implementations, the controller adjusts a start time point of the detection cycle based on a synchronous signal output by the image sensor, so that a difference between the first time and a time for outputting the synchronous signal is equal to a preset value, a cycle of the synchronous signal is equal to a positive integer multiple of the ADC cycle, one ADC cycle of the image sensor corresponds to one time of CDS, and one detection cycle corresponds to output of two detection signals.

The synchronous signal is adjusted to avoid the following case: As time elapses, due to accumulation of errors caused by a clock frequency, only one of two detection signals in one detection cycle appears in a time in which the image sensor performs sampling.

According to a second aspect, a control method for a shape memory alloy SMA motor in a photographing apparatus is provided. The photographing apparatus includes the SMA motor, an image sensor, a lens, and a controller, the SMA motor includes at least one SMA wire, the at least one SMA wire is configured to deform to drive the lens to move, the controller is configured to output a pulse signal, the pulse signal includes a drive signal and a detection signal, the drive signal is used to cause a first SMA wire in the at least one SMA wire to deform, the detection signal is used to detect deformation of the first SMA wire, N times a pulse signal cycle is equal to a time difference between the first time of sampling and the second time of sampling in correlated double sampling CDS of the image sensor, and N is a positive integer. The method includes: The controller outputs a first drive signal, where the drive signal includes the first drive signal; and the controller outputs a first detection signal, where a width of the first detection signal is equal to a width of the drive signal, the first detection signal is a signal in a preset time range before or after the first drive signal, and the detection signal includes the first detection signal.

The detection signal is set to a same width as the drive signal adjacent to the detection signal, so that stripe noise in an image generated by the image sensor is eliminated.

With reference to the second aspect, in some possible implementations, the method includes: The controller adjusts a start time point of a detection cycle based on a synchronous signal output by the image sensor, so that a difference between a time for outputting the first detection signal and a time for outputting the synchronous signal is equal to a preset value, a cycle of the synchronous signal is equal to a positive integer multiple of an analog-to-digital conversion ADC cycle of the image sensor, one ADC cycle of the image sensor corresponds to one time of CDS, and one detection cycle corresponds to output of one detection signal.

The start time point of the cycle of the detection signal is adjusted based on the synchronous signal, so that noise stripes appear at relatively fixed positions in the image. In this way, attention to stripe noise by human eyes is reduced, and user experience is improved.

According to a third aspect, a control method for a shape memory alloy SMA motor in a photographing apparatus is provided. The photographing apparatus includes the SMA motor, an image sensor, a lens, and a controller, the SMA motor includes at least one SMA wire, the at least one SMA wire is configured to deform to drive the lens to move, the controller is configured to output a pulse signal, the pulse signal includes a drive signal and a detection signal, the drive signal is used to cause a first SMA wire in the at least one SMA wire to deform, the detection signal is used to detect deformation of the first SMA wire, N times a pulse signal cycle is equal to a time difference between the first time of sampling and the second time of sampling in correlated double sampling CDS of the image sensor, and N is a positive integer. The method includes: The controller outputs at least one drive signal; and the controller outputs a first detection signal, where a width of the first detection signal is less than or equal to a maximum value of a width of the at least one drive signal, the width of the first detection signal is greater than or equal to a minimum value of the width of the at least one drive signal, and the detection signal includes the first detection signal.

A width of the detection signal is set to a range similar to a width of the drive signal, so that noise stripes in an image generated by the image sensor are reduced.

With reference to the third aspect, in some possible implementations, the controller adjusts a start time point of the detection cycle based on a synchronous signal output by the image sensor, so that a difference between a time for outputting the first detection signal and a time for outputting the synchronous signal is equal to a preset value, a cycle of the synchronous signal is equal to a positive integer multiple of an analog-to-digital conversion ADC cycle of the image sensor, one ADC cycle of the image sensor corresponds to one time of CDS, and one detection cycle corresponds to output of one detection signal.

The start time point of the cycle of the detection signal is adjusted based on the synchronous signal, so that noise stripes appear at relatively fixed positions in the image. In this way, attention to stripe noise by human eyes is reduced, and user experience is improved.

According to a fourth aspect, a control method for a shape memory alloy SMA motor in a photographing apparatus is provided. The photographing apparatus includes the SMA motor, an image sensor, a lens, and a controller, the SMA motor includes at least one SMA wire, the at least one SMA wire is configured to deform to drive the lens to move, the controller is configured to output a pulse signal, the pulse signal includes a drive signal and a detection signal, the drive signal is used to cause a first SMA wire in the at least one SMA wire to deform, the detection signal is used to detect deformation of the first SMA wire, N times a pulse signal cycle is equal to a time difference between the first time of sampling and the second time of sampling in correlated double sampling CDS of the image sensor, and N is a positive integer. The method includes: The controller obtains current resolution information; the controller determines a first interval in each ADC cycle of the image sensor based on the current resolution information and a correspondence between the resolution information and the first interval, where the first interval corresponds to one time of CDS; and the controller outputs the detection signal in a first time other than the first interval in one ADC cycle.

A time for outputting the detection signal is set, so that the detection signal is output in a time other than a sampling time of the image sensor. In this way, the detection signal is prevented from interfering with sampling of the image sensor. The image sensor performs correlated double sampling, and a time interval for sampling is in a one-to-one correspondence with resolution of an image generated by the image sensor. The time other than the sampling time of the image sensor may be determined based on the current resolution information and the correspondence between the resolution information and the first interval in each ADC cycle of the image sensor.

With reference to the fourth aspect, in some possible implementations, one analog-to-digital conversion ADC cycle of the image sensor corresponds to one time of CDS, a detection cycle of the detection signal is equal to a positive integer multiple of the ADC cycle, and one detection cycle corresponds to output of one detection signal.

The cycle of the detection signal is set, so that the detection signal is prevented from being output in the first interval. In this way, a difficulty in designing a time sequence for outputting the pulse signal can be reduced.

With reference to the fourth aspect, in some possible implementations, the method includes: The controller adjusts a start time point of the detection cycle based on a synchronous signal output by the image sensor, so that a difference between the first time and a time for outputting the synchronous signal is equal to a preset value, a cycle of the synchronous signal is equal to a positive integer multiple of the ADC cycle, one ADC cycle of the image sensor corresponds to one time of CDS, and one detection cycle corresponds to output of one detection signal.

The start time point of the detection cycle is adjusted by using the synchronous signal, to avoid the following case: Due to accumulation of time and a phase change of the detection signal, the detection signal is output when the image sensor is performing sampling.

According to a fifth aspect, a photographing apparatus is provided, including a shape memory alloy SMA motor, an image sensor, a lens, and a controller. The SMA motor includes at least one SMA wire, the at least one SMA wire is configured to deform to drive the lens to move, the controller is configured to output a pulse signal, the pulse signal includes a drive signal and a detection signal, the drive signal is used to cause a first SMA wire in the at least one SMA wire to deform, the detection signal is used to detect deformation of the first SMA wire, N times a pulse signal cycle is equal to a time difference between the first time of sampling and the second time of sampling in correlated double sampling CDS of the image sensor, and N is a positive integer. The detection signal includes a first detection signal and a second detection signal, a pulse width of the first detection signal is equal to a pulse width of the second detection signal, the first detection signal is output in a first time, the second detection signal is output in a second time, the first time corresponds to the first time of sampling, and the second time corresponds to the second time of sampling.

The two detection signals with equal widths are output in time periods corresponding to two times of sampling in the correlated double sampling of the image sensor, so that interference caused by the detection signals to the two times of sampling is basically equal. In this way, noise stripes in an image generated by the image sensor are eliminated.

With reference to the fifth aspect, in some possible implementations, one analog-to-digital conversion ADC cycle of the image sensor corresponds to one time of CDS, a detection cycle of the detection signal is equal to a positive integer multiple of the ADC cycle, and one detection cycle corresponds to output of two detection signals.

The detection cycle for outputting the detection signal is set, so that the detection cycle of the detection signal is equal to the positive integer multiple of the ADC cycle. In this way, a difficulty in designing a time sequence of the pulse signal is reduced.

With reference to the fifth aspect, in some possible implementations, the controller is further configured to adjust a start time point of the detection cycle based on a synchronous signal output by the image sensor, so that a difference between the first time and a time for outputting the synchronous signal is equal to a preset value, a cycle of the synchronous signal is equal to a positive integer multiple of the ADC cycle, one ADC cycle of the image sensor corresponds to one time of CDS, and one detection cycle corresponds to output of two detection signals.

The synchronous signal is adjusted to avoid the following case: As time elapses, due to accumulation of errors caused by a clock frequency, only one of two detection signals in one detection cycle appears in a time in which the image sensor performs sampling.

According to a sixth aspect, a photographing apparatus is provided, including a shape memory alloy SMA motor, an image sensor, a lens, and a controller. The SMA motor includes at least one SMA wire, the at least one SMA wire is configured to deform to drive the lens to move, the controller is configured to output a pulse signal, the pulse signal includes a drive signal and a detection signal, the drive signal is used to cause a first SMA wire in the at least one SMA wire to deform, the detection signal is used to detect deformation of the first SMA wire, N times a pulse signal cycle is equal to a time difference between the first time of sampling and the second time of sampling in correlated double sampling CDS of the image sensor, and N is a positive integer. The drive signal includes a first drive signal. The detection signal includes a first detection signal, a width of the first detection signal is equal to a width of the drive signal, and the first detection signal is a signal in a preset time range before or after the first drive signal.

The detection signal is set to a same width as the drive signal adjacent to the detection signal, so that stripe noise in an image generated by the image sensor is eliminated.

With reference to the sixth aspect, in some possible implementations, the controller is further configured to adjust a start time point of a detection cycle based on a synchronous signal output by the image sensor, so that a difference between a time for outputting the first detection signal and a time for outputting the synchronous signal is equal to a preset value, a cycle of the synchronous signal is equal to a positive integer multiple of an analog-to-digital conversion ADC cycle of the image sensor, one ADC cycle of the image sensor corresponds to one time of CDS, and one detection cycle corresponds to output of one detection signal.

The start time point of the cycle of the detection signal is adjusted based on the synchronous signal, so that noise stripes appear at relatively fixed positions in the image. In this way, attention to stripe noise by human eyes is reduced, and user experience is improved.

According to a seventh aspect, a photographing apparatus is provided, including a shape memory alloy SMA motor, an image sensor, a lens, and a controller. The SMA motor includes an SMA wire, the SMA wire is configured to deform to drive the lens to move, the controller is configured to output a pulse signal, the pulse signal includes at least one drive signal and at least one detection signal, the drive signal is used to cause the SMA wire to deform, the detection signal is used to detect deformation of the SMA wire, N times a pulse signal cycle is equal to a time difference between the first time of sampling and the second time of sampling in correlated double sampling CDS of the image sensor, and N is a positive integer. The at least one detection signal includes a first detection signal, a width of the first detection signal is less than or equal to a maximum value of a width of the at least one drive signal, the width of the first detection signal is greater than or equal to a minimum value of the width of the at least one drive signal, and the detection signal includes the first detection signal.

A width of the detection signal is set to a range similar to a width of the drive signal, so that noise stripes in an image generated by the image sensor are reduced.

With reference to the seventh aspect, in some possible implementations, the controller is further configured to adjust a start time point of the detection cycle based on a synchronous signal output by the image sensor, so that a difference between a time for outputting the first detection signal and a time for outputting the synchronous signal is equal to a preset value, a cycle of the synchronous signal is equal to a positive integer multiple of an analog-to-digital conversion ADC cycle of the image sensor, one ADC cycle of the image sensor corresponds to one time of CDS, and one detection cycle corresponds to output of one detection signal.

The start time point of the cycle of the detection signal is adjusted based on the synchronous signal, so that noise stripes appear at relatively fixed positions in the image. In this way, attention to stripe noise by human eyes is reduced, and user experience is improved.

According to an eighth aspect, a photographing apparatus is provided, including a shape memory alloy SMA motor, an image sensor, a lens, and a controller. The SMA motor includes at least one SMA wire, the at least one SMA wire is configured to deform to drive the lens to move, the controller is configured to output a pulse signal, the pulse signal includes a drive signal and a detection signal, the drive signal is used to cause a first SMA wire in the at least one SMA wire to deform, the detection signal is used to detect deformation of the first SMA wire, N times a pulse signal cycle is equal to a time difference between the first time of sampling and the second time of sampling in correlated double sampling CDS of the image sensor, and N is a positive integer. The controller is configured to obtain current resolution information. The controller is further configured to determine a first interval in each ADC cycle of the image sensor based on the current resolution information and a correspondence between the resolution information and the first interval, where the first interval corresponds to one time of CDS. The controller is further configured to output the detection signal in a first time other than the first interval in one ADC cycle.

A time for outputting the detection signal is set, so that the detection signal is output in a time other than a sampling time of the image sensor. In this way, the detection signal is prevented from interfering with sampling of the image sensor.

With reference to the eighth aspect, in some possible implementations, one analog-to-digital conversion ADC cycle of the image sensor corresponds to one time of CDS, a detection cycle of the detection signal is equal to a positive integer multiple of the ADC cycle, and one detection cycle corresponds to output of one detection signal.

The cycle of the detection signal is set, so that the detection signal is prevented from being output in the first interval. In this way, a difficulty in designing a time sequence for outputting the pulse signal can be reduced.

With reference to the eighth aspect, in some possible implementations, the controller is further configured to adjust a start time point of the detection cycle based on a synchronous signal output by the image sensor, so that a difference between the first time and a time for outputting the synchronous signal is equal to a preset value, a cycle of the synchronous signal is equal to a positive integer multiple of the ADC cycle, one ADC cycle of the image sensor corresponds to one time of CDS, and one detection cycle corresponds to output of one detection signal.

The start time point of the detection cycle is adjusted by using the synchronous signal, to avoid the following case: Due to accumulation of time and a phase change of the detection signal, the detection signal is output when the image sensor is performing sampling.

According to a ninth aspect, a control apparatus in a photographing apparatus is provided. The photographing apparatus includes an SMA motor, an image sensor, a lens, and the control apparatus, the SMA motor includes at least one SMA wire, the at least one SMA wire is configured to deform to drive the lens to move, the control apparatus is configured to output a pulse signal, the pulse signal includes a drive signal and a detection signal, the drive signal is used to cause a first SMA wire in the at least one SMA wire to deform, the detection signal is used to detect deformation of the first SMA wire, N times a pulse signal cycle is equal to a time difference between the first time of sampling and the second time of sampling in correlated double sampling CDS of the image sensor, and N is a positive integer. The method includes: The control apparatus outputs a first detection signal in a first time, where the first time corresponds to the first time of sampling; and the control apparatus outputs a second detection signal in a second time, where a pulse width of the second detection signal is equal to a pulse width of the first detection signal, the second time corresponds to the second time of sampling, and the detection signal includes the first detection signal and the second detection signal.

The two detection signals with equal widths are output in time periods corresponding to two times of sampling in the correlated double sampling of the image sensor, so that interference caused by the detection signals to the two times of sampling is basically equal. In this way, noise stripes in an image generated by the image sensor are eliminated.

With reference to the ninth aspect, in some possible implementations, one analog-to-digital conversion ADC cycle of the image sensor corresponds to one time of CDS, a detection cycle of the detection signal is equal to a positive integer multiple of the ADC cycle, and one detection cycle corresponds to output of two detection signals.

The detection cycle for outputting the detection signal is set, so that the detection cycle of the detection signal is equal to the positive integer multiple of the ADC cycle. In this way, a difficulty in designing a time sequence of the pulse signal is reduced.

With reference to the ninth aspect, in some possible implementations, the control apparatus adjusts a start time point of the detection cycle based on a synchronous signal output by the image sensor, so that a difference between the first time and a time for outputting the synchronous signal is equal to a preset value, a cycle of the synchronous signal is equal to a positive integer multiple of the ADC cycle, one ADC cycle of the image sensor corresponds to one time of CDS, and one detection cycle corresponds to output of two detection signals.

The synchronous signal is adjusted to avoid the following case: As time elapses, due to accumulation of errors caused by a clock frequency, only one of two detection signals in one detection cycle appears in a time in which the image sensor performs sampling.

According to a tenth aspect, a control apparatus in a photographing apparatus is provided. The photographing apparatus includes an SMA motor, an image sensor, a lens, and the control apparatus, the SMA motor includes at least one SMA wire, the at least one SMA wire is configured to deform to drive the lens to move, the control apparatus is configured to output a pulse signal, the pulse signal includes a drive signal and a detection signal, the drive signal is used to cause a first SMA wire in the at least one SMA wire to deform, the detection signal is used to detect deformation of the first SMA wire, N times a pulse signal cycle is equal to a time difference between the first time of sampling and the second time of sampling in correlated double sampling CDS of the image sensor, and N is a positive integer. The method includes: The control apparatus outputs a first drive signal, where the drive signal includes the first drive signal; and the control apparatus outputs a first detection signal, where a width of the first detection signal is equal to a width of the drive signal, the first detection signal is a signal in a preset time range before or after the first drive signal, and the detection signal includes the first detection signal.

The detection signal is set to a same width as the drive signal adjacent to the detection signal, so that stripe noise in an image generated by the image sensor is eliminated.

With reference to the tenth aspect, in some possible implementations, the method includes: The control apparatus adjusts a start time point of a detection cycle based on a synchronous signal output by the image sensor, so that a difference between a time for outputting the first detection signal and a time for outputting the synchronous signal is equal to a preset value, a cycle of the synchronous signal is equal to a positive integer multiple of an analog-to-digital conversion ADC cycle of the image sensor, one ADC cycle of the image sensor corresponds to one time of CDS, and one detection cycle corresponds to output of one detection signal.

The start time point of the cycle of the detection signal is adjusted based on the synchronous signal, so that noise stripes appear at relatively fixed positions in the image. In this way, attention to stripe noise by human eyes is reduced, and user experience is improved.

According to an eleventh aspect, a control apparatus in a photographing apparatus is provided. The photographing apparatus includes an SMA motor, an image sensor, a lens, and the control apparatus, the SMA motor includes at least one SMA wire, the at least one SMA wire is configured to deform to drive the lens to move, the control apparatus is configured to output a pulse signal, the pulse signal includes a drive signal and a detection signal, the drive signal is used to cause a first SMA wire in the at least one SMA wire to deform, the detection signal is used to detect deformation of the first SMA wire, N times a pulse signal cycle is equal to a time difference between the first time of sampling and the second time of sampling in correlated double sampling CDS of the image sensor, and N is a positive integer. The method includes: The control apparatus outputs at least one drive signal; and the control apparatus outputs a first detection signal, where a width of the first detection signal is less than or equal to a maximum value of a width of the at least one drive signal, the width of the first detection signal is greater than or equal to a minimum value of the width of the at least one drive signal, and the detection signal includes the first detection signal.

A width of the detection signal is set to a range similar to a width of the drive signal, so that noise stripes in an image generated by the image sensor are reduced.

With reference to the eleventh aspect, in some possible implementations, the control apparatus adjusts a start time point of the detection cycle based on a synchronous signal output by the image sensor, so that a difference between a time for outputting the first detection signal and a time for outputting the synchronous signal is equal to a preset value, a cycle of the synchronous signal is equal to a positive integer multiple of an analog-to-digital conversion ADC cycle of the image sensor, one ADC cycle of the image sensor corresponds to one time of CDS, and one detection cycle corresponds to output of one detection signal.

The start time point of the cycle of the detection signal is adjusted based on the synchronous signal, so that noise stripes appear at relatively fixed positions in the image. In this way, attention to stripe noise by human eyes is reduced, and user experience is improved.

According to a twelfth aspect, a control apparatus in a photographing apparatus is provided. The photographing apparatus includes an SMA motor, an image sensor, a lens, and the control apparatus, the SMA motor includes at least one SMA wire, the at least one SMA wire is configured to deform to drive the lens to move, the control apparatus is configured to output a pulse signal, the pulse signal includes a drive signal and a detection signal, the drive signal is used to cause a first SMA wire in the at least one SMA wire to deform, the detection signal is used to detect deformation of the first SMA wire, N times a pulse signal cycle is equal to a time difference between the first time of sampling and the second time of sampling in correlated double sampling CDS of the image sensor, and N is a positive integer. The method includes: The control apparatus obtains current resolution information; the control apparatus determines a first interval in each ADC cycle of the image sensor based on the current resolution information and a correspondence between the resolution information and the first interval, where the first interval corresponds to one time of CDS; and the control apparatus outputs the detection signal in a first time other than the first interval in one ADC cycle.

A time for outputting the detection signal is set, so that the detection signal is output in a time other than a sampling time of the image sensor. In this way, the detection signal is prevented from interfering with sampling of the image sensor.

With reference to the twelfth aspect, in some possible implementations, one analog-to-digital conversion ADC cycle of the image sensor corresponds to one time of CDS, a detection cycle of the detection signal is equal to a positive integer multiple of the ADC cycle, and one detection cycle corresponds to output of one detection signal.

The cycle of the detection signal is set, so that the detection signal is prevented from being output in the first interval. In this way, a difficulty in designing a time sequence for outputting the pulse signal can be reduced.

With reference to the twelfth aspect, in some possible implementations, the method includes: The control apparatus adjusts a start time point of the detection cycle based on a synchronous signal output by the image sensor, so that a difference between the first time and a time for outputting the synchronous signal is equal to a preset value, a cycle of the synchronous signal is equal to a positive integer multiple of the ADC cycle, one ADC cycle of the image sensor corresponds to one time of CDS, and one detection cycle corresponds to output of one detection signal.

The start time point of the detection cycle is adjusted by using the synchronous signal, to avoid the following case: Due to accumulation of time and a phase change of the detection signal, the detection signal is output when the image sensor is performing sampling.

According to a thirteenth aspect, a computer program storage medium is provided. The computer program storage medium has program instructions, and when the program instructions are executed, the foregoing method is performed.

According to a fourteenth aspect, a chip is provided. The chip system includes at least one processor, and when program instructions are executed on the at least one processor, the foregoing method is performed.

BRIEF DESCRIPTION OF THE DRAWINGS

FIG. 15 is a schematic diagram of a pulse signal output by a controller;

FIG. 16 is a schematic flowchart of a control method for an SMA motor according to an embodiment of this application;

FIG. 17 is a schematic diagram of a pulse signal output by a controller according to an embodiment of this application;

FIG. 18 is a schematic diagram of a pulse signal output by a controller according to an embodiment of this application;

FIG. 19 is a schematic diagram of a pulse signal output by a controller according to an embodiment of this application;

FIG. 20 is a schematic diagram of a pulse signal output by a controller according to an embodiment of this application;

FIG. 21 is a schematic flowchart of a control method for an SMA motor according to an embodiment of this application;

FIG. 22 is a schematic diagram of a pulse signal output by a controller according to an embodiment of this application;

FIG. 23 is a schematic diagram of a pulse signal output by a controller according to an embodiment of this application;

DETAILED DESCRIPTION OF ILLUSTRATIVE EMBODIMENTS

The following describes technical solutions of this application with reference to the accompanying drawings.

A control method for a shape memory alloy SMA motor in a photographing apparatus provided in the embodiments of this application may be applied to electronic devices such as a mobile phone, a tablet computer, a wearable device, a vehicle-mounted device, an augmented reality (augmented reality, AR)/virtual reality (virtual reality, VR) device, a notebook computer, an ultra-mobile personal computer (ultra-mobile personal computer, UMPC), a netbook, and a personal digital assistant (personal digital assistant, PDA). A specific type of the electronic device is not limited in the embodiments of this application.

Figure 1:
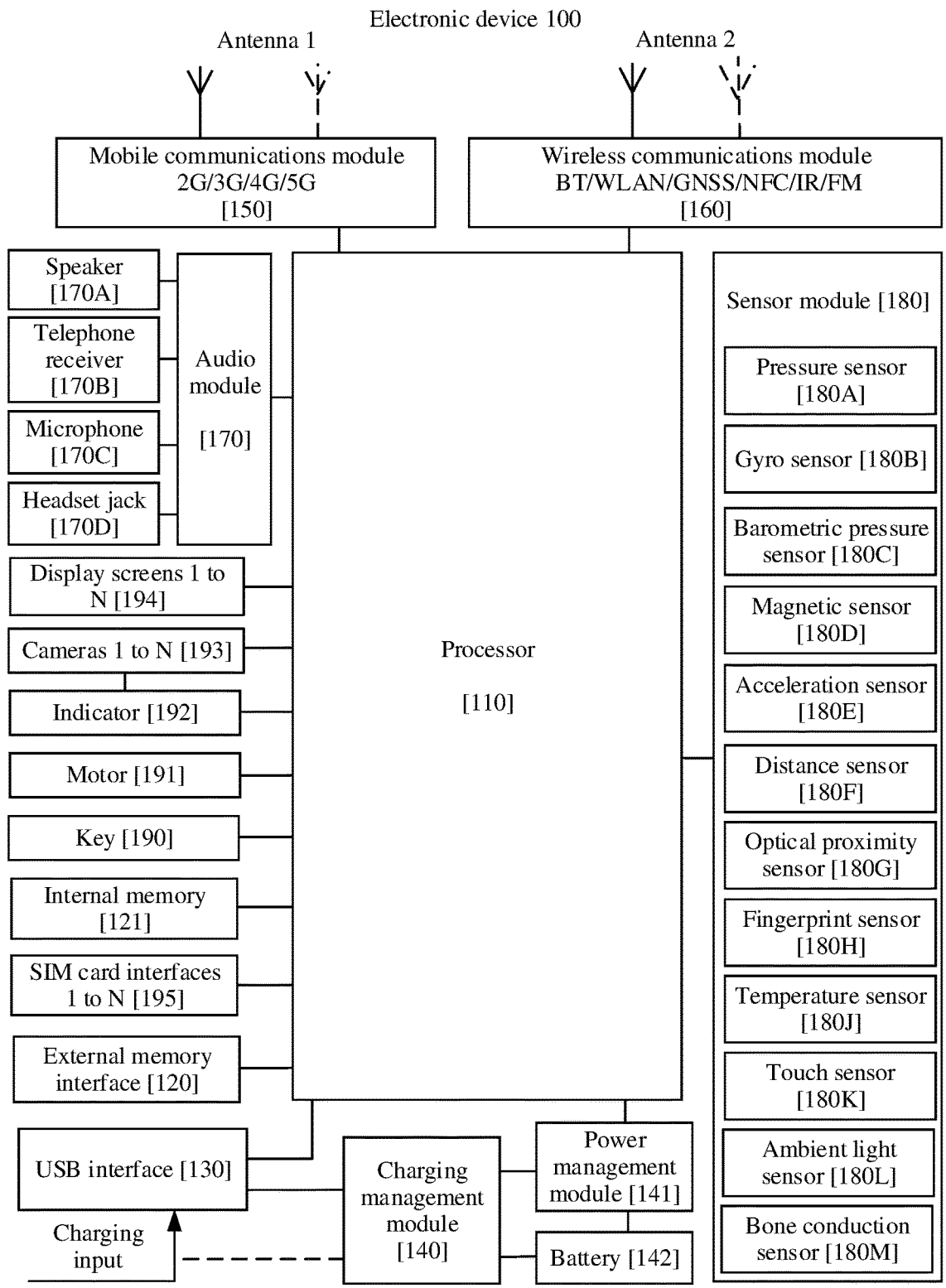
FIG. 1 is a schematic diagram of a hardware structure of an electronic device that is applicable to a photographing apparatus provided in this application.

FIG. 1 is a schematic structural diagram of an electronic device 100.

The electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communications module 150, a wireless communications module 160, an audio module 170, a speaker 170A, a telephone receiver 170B, a microphone 170C, a headset jack 170D, a sensor module 180, a key 190, a motor 191, an indicator 192, a camera 193, a display screen 194, and a subscriber identification module (subscriber identification module, SIM) card interface 195. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that a structure shown in this embodiment of this application does not constitute a specific limitation to the electronic device 100. In some other embodiments of this application, the electronic device 100 may include more or fewer components than those shown in the figure, or combine some components, or split some components, or have different component arrangements. The components shown in the figure may be implemented by hardware, software, or a combination of software and hardware.

The processor 110 may include one or more processing units. For example, the processor 110 may include at least one of an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and a neural network processing unit (neural-network processing unit, NPU). Different processing units may be independent components, or may be integrated into one or more processors.

The controller may be a neural center and a command center of the electronic device 100. The controller may generate an operation control signal based on instruction operation code and a time sequence signal, to control a fetch instruction and an execute instruction.

A memory may be further disposed in the processor 110, and is configured to store instructions and data. In some embodiments, the memory in the processor 110 is a cache. The memory may store an instruction or data that has been recently used or cyclically used by the processor 110. If the processor 110 needs to use the instruction or the data again, the processor 110 may directly invoke the instruction or the data from the memory. Repeated access is avoided, and waiting time of the processor 110 is reduced, and therefore system efficiency is improved.

The display screen 194 is configured to display an image, a video, and the like. The display screen 194 includes a display panel. The display panel may be a liquid crystal display (liquid crystal display, LCD), an organic light-emitting diode (organic light-emitting diode, OLED), an active matrix organic light-emitting diode (active-matrix organic light emitting diode, AMOLED), a flexible light-emitting diode (flex light-emitting diode, FLED), a mini LED, a micro LED, a micro-oLED, a quantum dot light-emitting diode (quantum dot light emitting diodes, QLED), or the like. In some embodiments, the electronic device 100 may include one or N display screens 194, where N is a positive integer greater than 1.

The electronic device 100 may implement a photographing function by using the ISP, the camera 193, the video codec, the GPU, the display screen 194, the application processor, and the like.

The ISP is configured to process data fed back by the camera 193. For example, during photographing, a shutter is turned on, and light is transmitted to a photosensitive element of the camera by using a lens, so that an optical signal is converted into an electrical signal, and the photosensitive element of the camera transmits the electrical signal to the ISP for processing, to convert the electrical signal into a macroscopic image. The ISP may further perform algorithm optimization on image noise, luminance, and complexion. The ISP may further optimize parameters such as exposure to a photographing scenario and color temperature. In some embodiments, the ISP may be disposed in the camera 193.

The camera 193 is configured to capture a static image or a video. An optical image of an object is generated by using the lens and is projected to the photosensitive element. The photosensitive element may also be referred to as an image sensor. The photosensitive element may be a charge-coupled device (charge coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format such as RGB or YUV. In some embodiments, the electronic device 100 may include one or N cameras 193, where N is a positive integer greater than 1.

The digital signal processor is configured to process a digital signal, and may process another digital signal in addition to the digital image signal. For example, when the electronic device 100 selects a frequency, the digital signal processor is configured to perform Fourier transform or the like on frequency energy.

The video codec is configured to compress or decompress a digital video. The electronic device 100 can support one or more video codecs. In this way, the electronic device 100 can play or record videos in a plurality of encoding formats, for example, moving picture experts group (moving picture experts group, MPEG) 1, MPEG 2, MPEG 3, and MPEG 4.

The internal memory 121 may be configured to store computer-executable program code, and the executable program code includes instructions. The processor 110 performs various functional applications and data processing of the electronic device 100 by running the instructions stored in the internal memory 121. The internal memory 121 may include a program storage area and a data storage area. The program storage area may store an operating system, an application program required by at least one function (such as a sound playing function and an image playing function), and the like. The data storage area may store data (such as audio data and a phone book) and the like created during use of the electronic device 100. In addition, the internal memory 121 may include a high-speed random access memory, and may further include a non-volatile memory such as at least one magnetic disk storage component, a flash memory component, or a universal flash storage (universal flash storage, UFS).

A software system of the electronic device 100 may use a hierarchical architecture, an event-driven architecture, a microcore architecture, a micro-service architecture, or a cloud architecture. In this embodiment of this application, an Android system of the hierarchical architecture is used as an example to illustrate a software structure of the electronic device 100.

Figure 2:
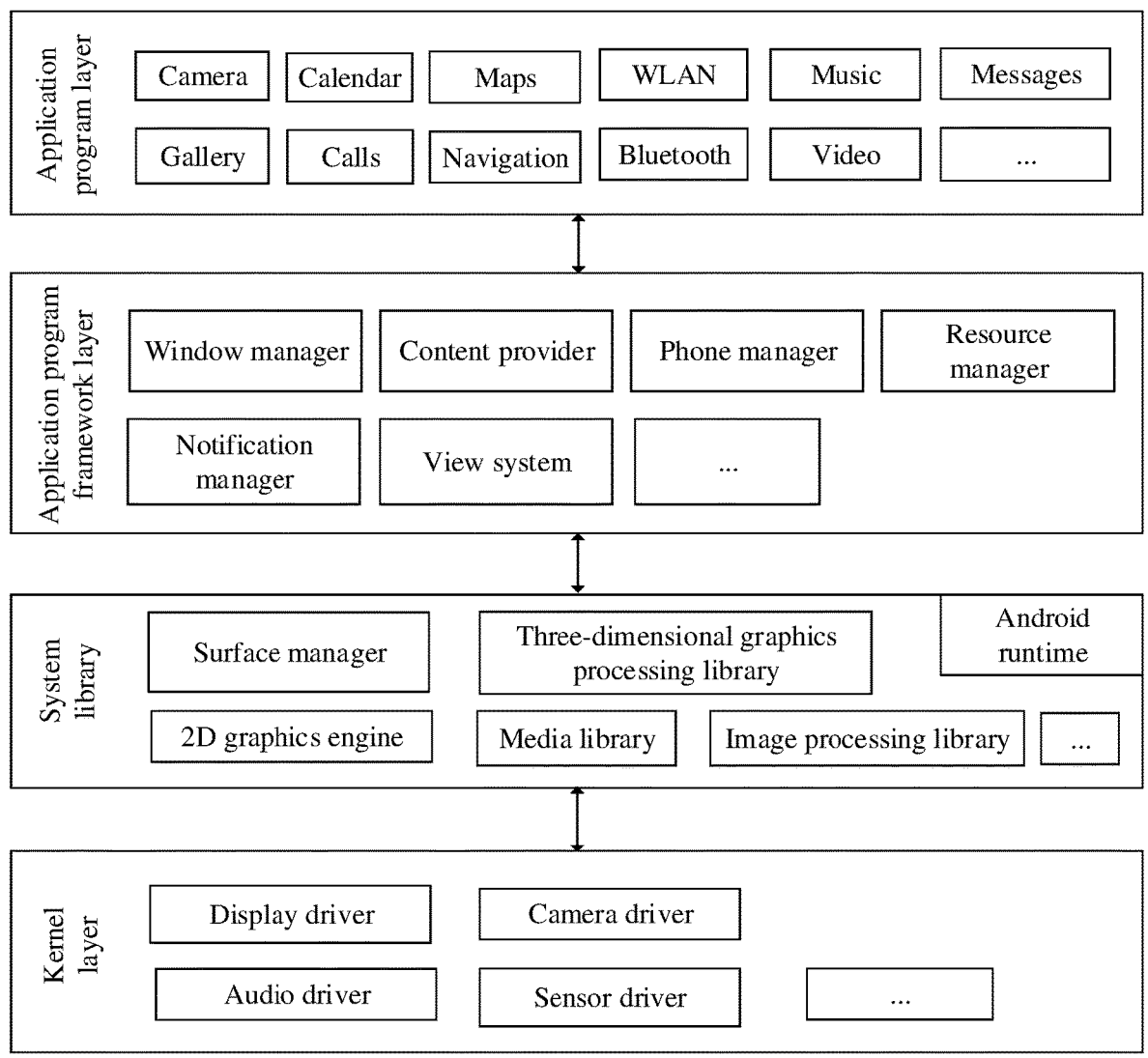
FIG. 2 is a schematic diagram of a software structure of an electronic device that is applicable to a photographing apparatus provided in this application.

FIG. 2 is a block diagram of a software structure of an electronic device 100 according to an embodiment of this application. In a hierarchical architecture, software is divided into several layers, and each layer has a clear role and task. Layers communicate with each other by using a software interface. In some embodiments, the Android system is divided into four layers, namely, an application program layer, an application program framework layer, an Android runtime (Android runtime) and a system library, and a kernel layer from top to bottom. The application program layer may include a series of application program packages.

As shown in FIG. 2, the application program package may include application programs such as Camera, Gallery, Calendar, Calls, Map, Navigation, WLAN, Bluetooth, Music, Video, and Messages.

The application program framework layer provides an application programming interface (application programming interface, API) and a programming framework for an application program at the application program layer. The application program framework layer includes some pre-defined functions.

For example, in this application, an image processing algorithm or the like may be included at the application program framework layer.

As shown in FIG. 2, the application program framework layer may include a window manager, a content provider, a view system, a phone manager, a resource manager, a notification manager, and the like.

The window manager is configured to manage a window program. The window manager may obtain a size of a display screen, determine whether there is a status bar, lock a screen, take a screenshot, and the like.

The content provider is configured to store and obtain data and enable the data to be accessible to the application program. The data may include a video, an image, audio, dialed and answered calls, browsing history, a bookmark, an address book, and the like.

For example, in this application, the content controller may obtain, in real time, an image collected from a preview interface, and display a processed image in the preview interface.

The view system includes a visual control, for example, a control for displaying text or a control for displaying a picture. The view system may be configured to create the application program. A display interface may include one or more views. For example, a display interface including a short message notification icon may include a view for displaying text and a view for displaying a picture.

For example, in this application, an image displayed in the display interface is collected by a photographing apparatus, and may be displayed by receiving an indication of a processor by a view system.

The phone manager is configured to provide a communication function of the electronic device 100, for example, call status (including call connection and hang-up) management.

The resource manager provides various resources such as a localized character string, an icon, a picture, a layout file, and a video file for the application program.

The notification manager enables the application program to display notification information at the status bar, and may be used to transmit a message of a notification type and may automatically disappear after a short stay without user interaction. For example, the notification manager is configured to notify a downloading complete, a message reminder, and the like. Alternatively, the notification manager may be a notification that appears at the status bar at the top of the system in a form of a diagram or scroll bar text, for example, a notification of an application program running in the background, or may be a notification that appears on the screen in a form of a dialog box. For example, text information is prompted at the status bar, a prompt tone is made, the electronic device vibrates, or the indicator light flickers.

The Android runtime includes a kernel library and a virtual machine. The Android runtime is responsible for scheduling and management of the Android system.

The kernel library includes two parts: a function that needs to be called by a java language, and an Android kernel library.

The application program layer and the application program framework layer run in the virtual machine. The virtual machine executes java files at the application program layer and the application program framework layer as binary files. The virtual machine is configured to perform functions such as object life cycle management, stack management, thread management, security and exception management, and garbage collection.

The system library may include a plurality of functional modules, for example, a surface manager (surface manager), a media library (media libraries), a three-dimensional graphics processing library (for example, OpenGL ES), and a 2D graphics engine (for example, SGL).

The surface manager is configured to manage a display subsystem, and provides fusion of 2D and 3D layers for a plurality of application programs.

The media library supports playback and recording of a plurality of common audio and video formats, a static image file, and the like. The media library may support a plurality of audio and video coding formats, for example, MPEG 4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

For ease of understanding, in the following embodiments of this application, an electronic device having structures shown in FIG. 1 and FIG. 2 is used as an example to specifically describe, with reference to accompanying drawings and application scenarios, a control method for a shape memory alloy SMA motor in a photographing apparatus provided in the embodiments of this application.

With the popularity of smartphones and the rapid development of related technologies in recent years, consumers have increasingly high requirements for a photographing effect of a mobile phone. To improve the photographing effect, movement of a lens needs to be controlled by using a motor in a camera assembly, to implement auto focus (auto focus, AF), optical image stabilization (optical image stabilization, OIS), and the like.

In an OIS technology, a gyroscope collects a shaking signal of a terminal device, and then drives, through translation of the motor in a reverse direction or rotation of the motor, the lens to move, to compensate for external shaking of the terminal device.

In an AF technology, according to a principle of light reflection of a photographed object, an image is formed on an image sensor after light reflected by the photographed object passes through the lens, and a computer obtains an object distance of the photographed object by processing the image generated by the image sensor, and then moves the lens based on the object distance to complete focus adjustment.

The motor includes a voice coil motor (voice coil motor, VCM), a shape memory alloy (shape memory alloy, SMA) motor, and the like. The SMA motor is characterized by advantages such as a small size or a strong driving capability.

Figure 3:
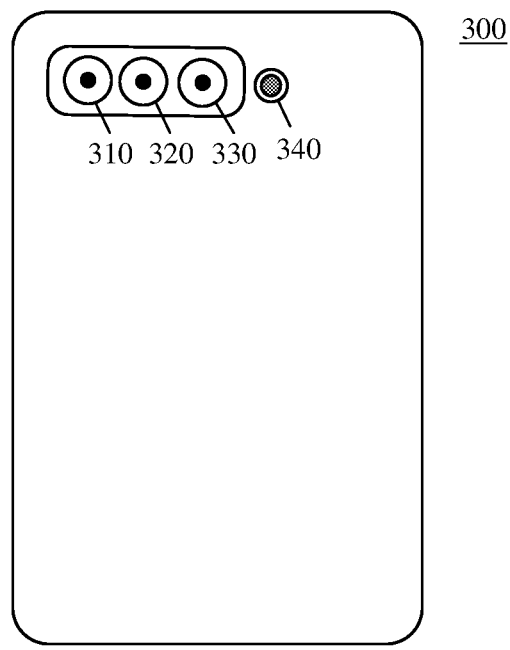
FIG. 3 is a schematic diagram of an electronic device that is applicable to a photographing apparatus provided in this application.

FIG. 3 is a schematic structural diagram of an electronic device 300. For a structure of the terminal device 300, refer to FIG. 1. The electronic device 300 may include more or fewer components than the electronic device 100. A software system of the electronic device 300 may use a hierarchical architecture, an event-driven architecture, a micro-core architecture, a micro-service architecture, or a cloud architecture. For the software system of the electronic device 300, refer to FIG. 2.

The electronic device 300 may include one or more cameras. Each camera includes one lens. As shown in FIG. 3, the electronic device 300 may include a lens 310 to a lens 330 and a flash 340.

The electronic device 300 may include one or more of a standard lens, a pantoscopic lens, a long-focus lens, a macro lens, and the like. For example, the lens 310 and the lens 320 may be pantoscopic lenses, and the lens 330 may be a long-focus lens.

The standard lens is a general term for lenses whose angles of view are approximately 50 degrees, and is a photographing lens whose focal length is approximately equal to a diagonal length of a photographed image. The standard lens is a basic photographing lens.

The pantoscopic lens is also referred to as a short lens, and is characterized by advantages such as a short focal length and a large angle of view. The pantoscopic lens can shoot a scene in a wide scope at a relatively short distance. A foreground is relatively prominent, a range of depth of field of the pantoscopic lens is prominently larger than those of the standard lens and a telephoto lens, and a strong sense of longitudinal-depth of an image is implemented.

The long-focus lens has a long focal length, a small angle of view, and a large image on a photographic plate. Therefore, at a same distance, the long-focus lens can photograph a larger image than the standard lens, and is suitable for photographing an object in a distance.

The macro lens is a special lens used for macrophotographing, and is mainly used to photograph very small objects, such as flowers and insects.

The flash 340 is also referred to as an electronic flash or a high-speed flash. The flash 330 stores a high voltage by using a capacitor, and a pulse triggers a flash tube to discharge, to complete instantaneous flash. In a dark place, a scene or an object can be brightened by the flash.

Figure 4:
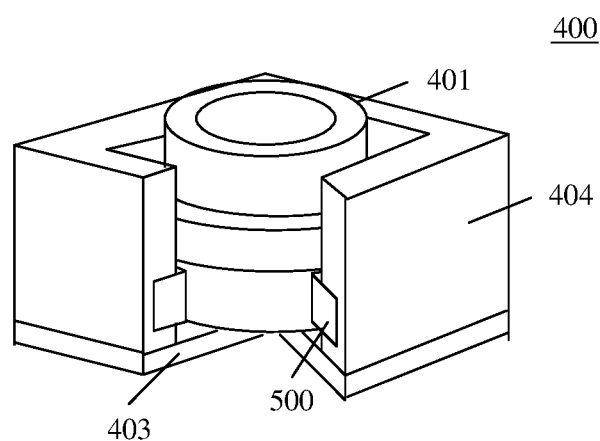
FIG. 4 is a schematic structural diagram of a photographing apparatus according to this application.

FIG. 4 is a schematic structural diagram of a photographing apparatus. A photographing apparatus 400 may be a camera 193. The photographing apparatus 400 includes a lens 401, an SMA motor 500, a PCB board 403, and a rack 404. The lens 401 may be any lens in the lens 310 to the lens 330 in the electronic device 300, or may be another lens such as a front-facing lens.

The SMA motor 500 is configured to convert electric energy into mechanical energy. The SMA motor 500 is disposed on the rack 404. The SMA motor 500 surrounds a sidewall of the lens 401. The lens 401 is configured to collect an image.

The SMA motor 500 includes an SMA wire, and scalable deformation the SMA wire controls the lens 401 to move.

The PCB board 403 includes an image sensor and a controller. The image sensor is configured to convert an optical signal collected by the lens 401 into an electrical signal. The controller is configured to generate a control signal to control deformation of the SMA wire. The control signal generated by the controller may be a pulse signal.

The controller may be implemented by an independent integrated circuit (integrated circuit, IC) chip. The chip configured to implement a function of the controller may also be referred to as a drive chip or a drive IC.

The rack 404 is configured to fasten the PCB board 403 and a base plate in the SMA motor 500.

Figure 5:
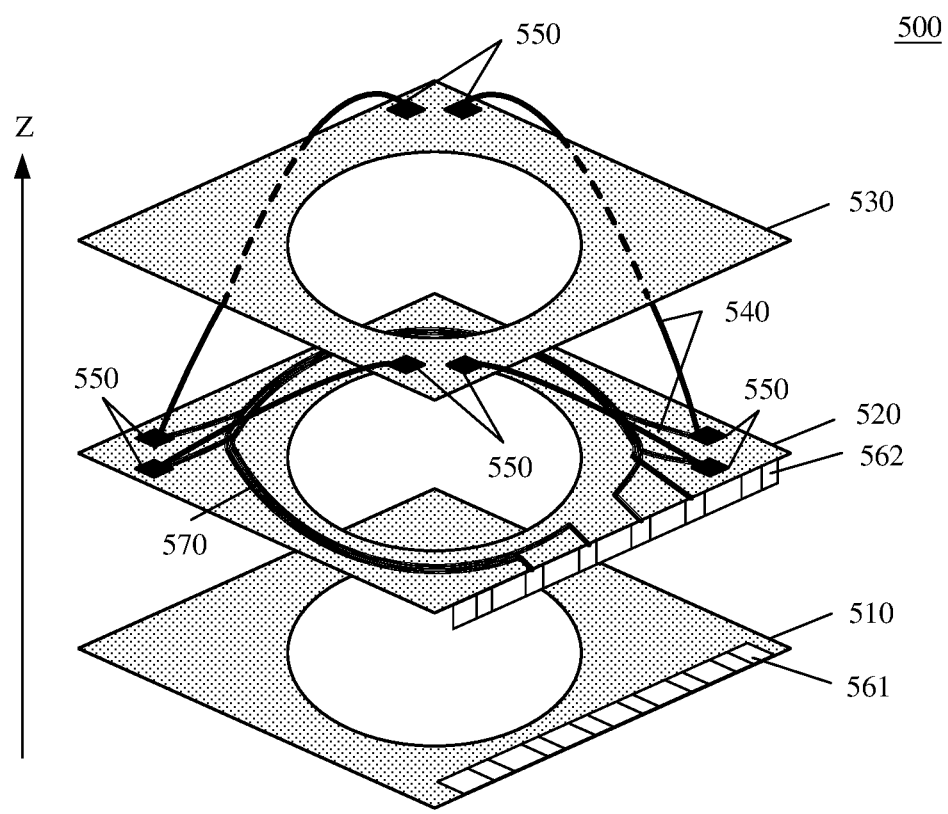
FIG. 5 is a schematic structural diagram of an SMA motor.

FIG. 5 is a schematic structural diagram of an SMA motor.

The SMA motor 500 includes a base plate 510, a fastening plate 520, and a movable plate 530 that are sequentially disposed in a Z-axis direction. The SMA motor 500 further includes an SMA wire 540, a clamping jaw 550, a pad 561, a pad 562, a metal conducting wire 570, and the like. The base plate 510 is mounted on the rack 404, and the fastening plate 520 is fastened on the base plate 510. The clamping jaw 550 is configured to fasten two ends of the SMA wire 540, and the SMA wire 540 is connected between the fastening plate 520 and the movable plate 530 by using clamping jaws 550. For each SMA wire 540, one end of the SMA wire 540 is fastened to the movable plate 530 by using a clamping jaw 550 on the movable plate 530, and the other end is fastened to the fastening plate 520 by using a clamping jaw 550 on the fastening plate 520. When the SMA wire 540 deforms, the movable plate 530 may move relative to the fastening plate 520. The base plate 510, the fastening plate 520, and the movable plate 530 are each in an annular structure, and surround the lens. Movement of the movable plate 530 can drive the lens to move.

The SMA motor 500 is configured to control, through scalable deformation the SMA wire 540, the lens 401 to move.

A length and a cross-sectional area of the SMA wire vary with temperature based on characteristics of an SMA material. At normal temperature, the SMA wire is a relaxed state. As temperature of the SMA wire increases, the length of the SMA wire contracts, to drive the movable plate 530 to move. The SMA wire heats when being powered on, in other words, a shape of the SMA wire can be adjusted by changing a power-on/off status of the SMA wire.

The clamping jaw on the movable plate 530 may be referred to as a mover. The clamping jaw on the fastening plate 520 may be referred to as a stator. One end of the SMA wire is fastened to the movable plate 530 by using the mover, and the other end is fastened to the fastening plate 520 by using the stator. Deformation of the SMA wire drives the movable plate 530 to move with the mover relative to the fastening plate 520, to drive the lens to move, so that an OIS function or an AF function is implemented. To effectively control the lens to move, stators are usually not concentrated in a small area of the fastening plate 520, but are distributed at different positions on the fastening plate 520. For example, stators are arranged on two vertices at diagonal positions on a fastening plate 520 similar to a quadrangle.

A controller on the PCB board 403 provides a drive signal for the SMA wire 540. The shape of the SMA wire 540 changes according to a change of the drive signal. To enable a drive signal output by a driver to pass through the SMA wire, the metal conducting wire 570 may be arranged on the fastening plate 520. Welding points on the pad 561 on the fastening plate 520 and welding points on the pad 562 on the base plate are in a one-to-one correspondence, and are welded together and electrically connected. A power supply signal, a signal output by the controller, and the like are transmitted to the metal conducting wire 570 through the pad 561 on the base plate and the pad 562 on the fastening plate 520.

The stators are located at relatively dispersed positions on the fastening plate 520, and the metal conducting wire 570 that is on the fastening plate 520 and that is connected between the pad and the SMA wire is generally arranged in an annular shape (or a shape similar to a ring). The annular metal conducting wire on the fastening plate 520 may be a flexible printed circuit (flexible printed circuit, FPC).

A metal conducting wire may also be disposed on the movable plate 530, and is used to connect to the SMA wire. A connecting spring may be disposed between the fastening plate 520 and the movable plate 530. The connecting spring is fastened on the fastening plate 520, may be configured to support the movable plate 530, and is electrically connected to the movable plate 530. One end that is of the SAM wire and that is located on the movable plate is connected to the metal conducting wire on the movable plate 530 by using the connecting spring, and is connected to a power output port of the controller by using the pad 561, the pad 562, and the like. The other end that is of the SMA wire and that is located on the fastening plate 520 is connected to an output port of a pulse signal of the controller by using the metal conducting wire 570 on the fastening plate 520, the pad 561, the pad 562, and the like. For a control circuit used by the controller to control the SMA motor, refer to FIG. 13.

SMA motors may be classified into a two-wire SMA motor, a four-wire SMA motor, an eight-wire SMA motor, and the like based on a quantity of SMA wires.

Figure 6:
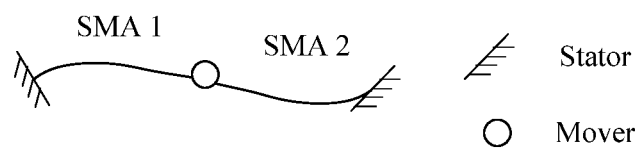
FIG. 6 is a schematic structural diagram of a two-wire SMA motor.

FIG. 6 is a schematic structural diagram of a two-wire SMA motor.

SMA 1 and SMA 2 are separately two SMA wires. A stator may be configured to indicate one or more clamping jaws on the fastening plate 520, and a position of the stator is relatively fixed relative to the base plate. A mover may be configured to indicate one or more clamping jaws on the movable plate 530. In a process in which the SMA wire deforms, a position of the mover relative to the stator changes, in other words, a position of the mover relative to the fastening plate 520 changes, to drive a position of the movable plate 530 to change relative to the fastening plate 520.

The controller outputs different drive signals, and a deformation amount of the SMA 1 and a deformation amount of the SMA 2 are different. Drive signals for the SMA 1 and the SMA 2 are adjusted, so that the SMA 1 and the SMA 2 may be controlled to drive movers to move, and therefore the movable plate 530 moves. For example, the SMA 1 changes from a contracted state to a relaxed state, and the SMA 2 changes to a contracted state, so that the movable plate moves in a direction towards a stator connected to the SMA 2.

Figure 7:
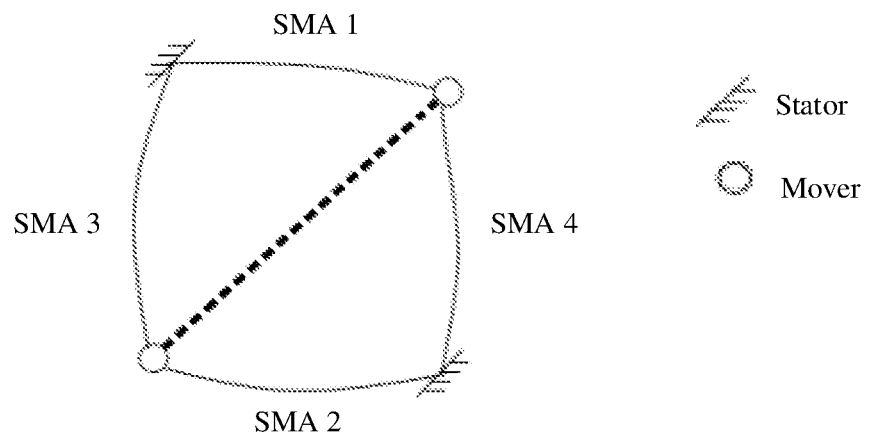
FIG. 7 is a schematic structural diagram of a four-wire SMA motor.

FIG. 7 is a schematic structural diagram of a four-wire SMA motor. SMA 1 to SMA 4 are separately four SMA wires. A position of a mover on the movable plate 530 is fixed, in other words, relative positions between movers are fixed. In the figure, the relative positions are indicated by a dashed line, and a length of the dashed line remains constant. For a structure of the four-wire SMA motor, refer to FIG. 5. In the figure, the dashed line connected between two movers may represent a diagonal line on the movable plate 530, and a clamping jaw is provided near each of two endpoints of the diagonal line, and the clamping jaws are separately connected to the SMA 1 to the SMA 4.

Figure 8:
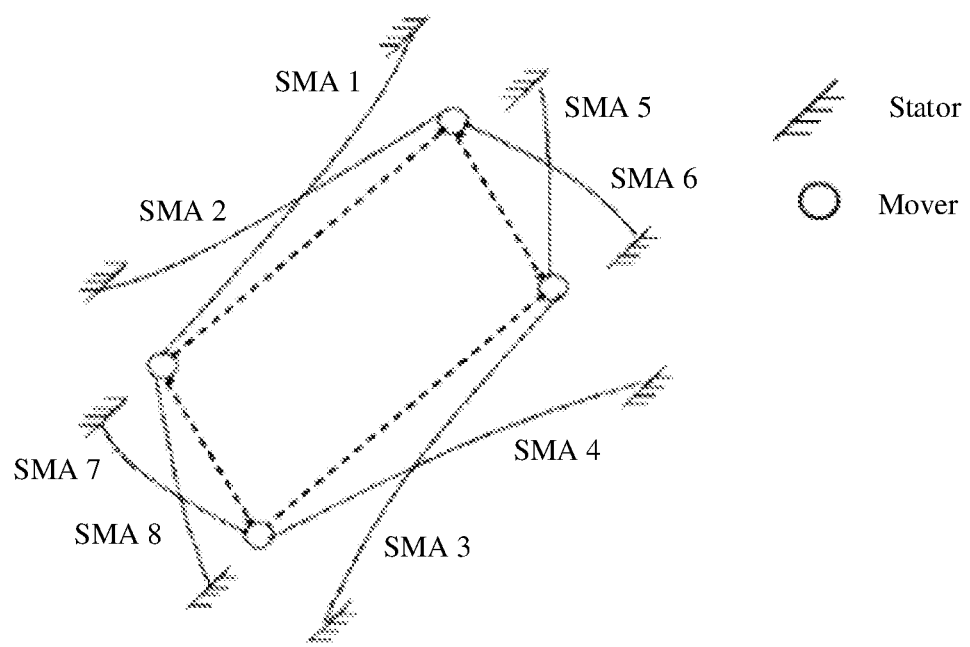
FIG. 8 is a schematic structural diagram of an eight-wire SMA motor.

FIG. 8 is a schematic structural diagram of an eight-wire SMA motor. SMA 1 to SMA 8 are separately eight SMA wires. Relative positions between movers are fixed. In the figure, the relative positions are indicated by dashed lines, and lengths and relative positions of the dashed lines remain unchanged.

Clamping jaws 550 are located at relatively scattered positions on the fastening plate 520 and the movable plate 530, for example, on the fastening plate 520, the clamping jaws 550 may be located at diagonal positions or the like on the fastening plate 520. To implement electrical connection between the metal conducting wire and the SMA wire, the metal conducting wire is usually set to an annular shape.

To drive the SMA motor, a signal in the metal conducting wire needs to change. A position of the SMA motor is quite close to the image sensor. Due to electromagnetic coupling, a change in the signal in the metal conducting wire on the fastening plate affects a voltage value of an analog power supply of the image sensor. When the image sensor performs sampling, the change in the signal in the metal conducting wire affects an image generated by the image sensor.

To reduce power consumption, a motor generally drives the SMA motor by using a pulse width modulation (pulse width modulation, PWM) signal. When a high level and a low level of the PWM signal are reversed, an annular metal conducting wire or a metal conducting wire in a shape similar to a ring on the fastening plate transmits the signal. The metal conducting wire is similar to a coil, and causes a change in a surrounding magnetic field. Through spatial coupling, such varying magnetic field space is perceived on an analog power supply of the image sensor on the PCB board. This causes strong interference to the analog power supply and affects an electrical signal generated by the image sensor.

In a process of shooting a video, the image sensor continuously collects an image to generate each frame of image in the video. Before shooting an image, that is, during photographing preview, to enable a terminal device to display a dynamic picture, the image sensor also needs to continuously collect an image.

The image sensor is configured to convert an optical signal into an electrical signal. Each frame (frame) of image generated by the image sensor is obtained by performing a plurality of times of sampling on the optical signal. Frame rates of images generated by the image sensor may be the same, in other words, images generated by the image sensor per unit time may have a same quantity of frames. Each frame of image generated by the image sensor corresponds to a plurality of signal collection cycles. The image sensor performs optical-signal-to-electrical-signal conversion once in each signal collection cycle, converts an optical signal into an electrical signal, and outputs the electrical signal. In a process of converting the optical signal into the electrical signal, the image sensor first converts the optical signal into an analog signal, and then converts the analog signal into a digital signal. Therefore, the signal collection cycle of the image sensor may also be referred to as an analog to digital conversion (analog to digital conversion, ADC) cycle. A shorter ADC cycle of the image sensor leads to a higher frame rate of the generated image.

The image sensor may collect images through sampling by rows or sampling by columns. Sampling by rows is used as an example. Corresponding to different image resolution, an area for each time of sampling may be one or more rows of image pixels. In other words, when the image sensor performs ADC sampling once, a signal output by the image sensor may correspond to one or more rows in an image (or image pixels).

To facilitate application of the image sensor, the image sensor may output some time sequence signals. The time sequence signal may include a synchronous signal. For example, the image sensor adopts sampling by rows, and the synchronous signal may include a frame synchronous signal and a horizontal synchronous (horizontal synchronous, H-SYNC) signal. These two types of synchronous signals are transmitted periodically.

The frame synchronous signal may also be referred to as a frame start signal, a column synchronous signal, or a vertical synchronous (vertical synchronous, V-SYNC) signal, and is used to indicate that the image sensor starts to collect a frame of image. Both the H-SYNC signal and the V-SYNC signal are pulse signals.

The horizontal synchronous signal is used to indicate that the image sensor sends, to a processor such as an image signal processor (image signal processor, ISP), a row of collected signals on which digital-to-analog conversion has been performed. The ADC cycle of the image sensor may be an integer multiple of a cycle of the horizontal synchronous signal. The ISP may be configured to process data fed back by the image sensor. The ISP may convert the electrical signal transmitted by the image sensor into an image visible to naked eyes. The ISP may further perform algorithm optimization on image noise, luminance, and complexion. The ISP may further optimize parameters such as exposure to a photographing scenario and color temperature. In some embodiments, the ISP may be disposed in a camera assembly. The cycle of the horizontal synchronous signal is equal to a cycle of sampling by rows of the image sensor.

For example, as an example instead of limiting, a signal output in one ADC cycle of the image sensor may correspond to one row in an image (or image pixels), in other words, the ADC cycle of the image sensor is equal to the H-SYNC cycle. In one ADC cycle of the image sensor, the image sensor collects a signal corresponding to one row in the image. The image sensor sends a digital signal corresponding to one row in the image to the ISP each time. The digital signal may be sent in the ADC cycle, or may be sent in a cycle in one or more subsequent cycles. This is not limited in this embodiment of this application. For example, in a first ADC cycle of the image sensor, the image sensor collects and converts a generated row of digital signals, and may send the digital signal to the ISP in a next ADC cycle. When sending the digital signal, the image sensor may output an H-SYNC signal.

For another example, a signal output in one ADC cycle of the image sensor may correspond to two rows in the image, in other words, the image sensor needs to perform analog-to-digital conversion once on two rows of signals, and the ADC cycle of the image sensor is twice the H-SYNC cycle. In one ADC cycle of the image sensor, the image sensor collects signals corresponding to two rows in an image. When outputting the H-SYNC signal, the image sensor may send, to the ISP, digital signals corresponding to two rows in the image.

Figure 9:
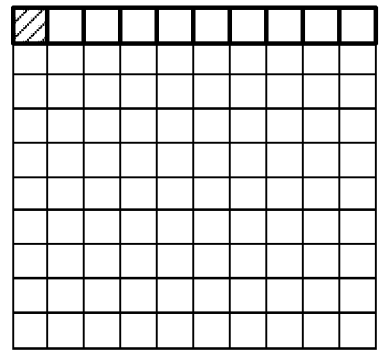
FIG. 9 is a schematic diagram of an image collected by an image sensor.
Figure 10:
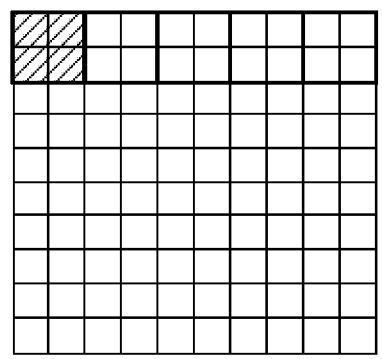
FIG. 10 is a schematic diagram of another image collected by an image sensor.

Referring to FIG. 9 and FIG. 10, the ADC cycle of the image sensor is described.

If an image generated based on data collected by the image sensor has n rows, the image sensor outputs one V-SYNC signal after every n H-SYNC signals are output, in other words, a cycle of the V-SYNC signal is n times an H-SYNC cycle.

When the ADC cycle of the image sensor is equal to the H-SYNC cycle, as shown in FIG. 9, a size of a sampling unit is 1×1. In one ADC cycle, a plurality of sampling units simultaneously perform sampling to collect data corresponding to one row in the image. When outputting H-SYNC, the image sensor sends the data corresponding to one row in the image to the ISP. When the ADC cycle of the image sensor is equal to the H-SYNC cycle, the cycle of the V-SYNC signal is n times the ADC cycle of the image sensor.

When the ADC cycle of the image sensor is twice the H-SYNC cycle, as shown in FIG. 10, a size of a sampling unit is 2×2. In one ADC cycle, a plurality of sampling units simultaneously perform sampling to collect data corresponding to two rows in the image. When outputting H-SYNC, the image sensor sends the data corresponding to one row in the image to the ISP. When the ADC cycle of the image sensor is twice the H-SYNC cycle, the cycle of the V-SYNC signal is n/2 times the ADC cycle of the image sensor.

It should be understood that the foregoing enumerated quantities of rows in the image (or image pixels) corresponding to a signal output by the image sensor in one ADC cycle are merely example descriptions. This application is not limited thereto. For example, the signal output by the image sensor in one ADC cycle may alternatively correspond to three or more rows in the image.

Figure 11:
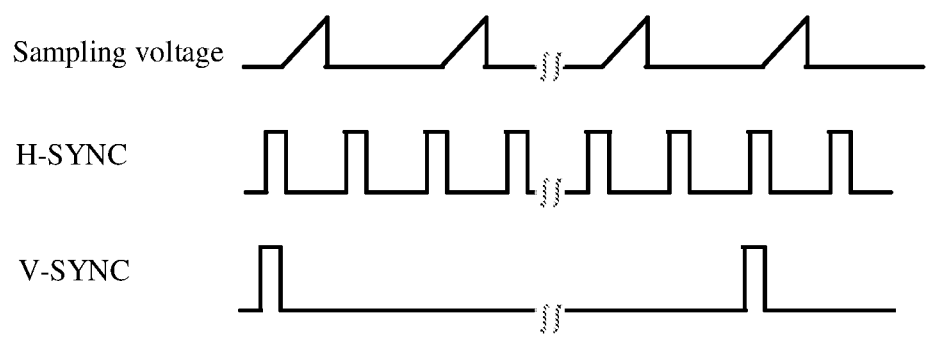
FIG. 11 is a schematic diagram of a synchronous signal and an analog-to-digital conversion cycle of an image sensor.

FIG. 11 is a schematic diagram of a synchronous signal and an ADC cycle of an image sensor.

The ADC cycle of the image sensor is twice an H-SYNC cycle. A time point at which the image sensor starts to perform sampling may be the same as a time point at which H-SYNC is output, or a time interval may exist. After collecting data of one frame of image, the image sensor outputs a V-SYNC signal, and starts to collect a next frame of image. A cycle of the V-SYNC signal is an integer multiple of a cycle of the horizontal synchronous signal. The cycle of the V-SYNC signal is an integer multiple of the ADC cycle of the image sensor.

A signal output in one ADC cycle of the image sensor may correspond to one or more rows in an image. In other words, the ADC cycle of the image sensor may be equal to an integer multiple of the H-SYNC cycle. In an application scenario, for a same image sensor, an ADC cycle remains unchanged. In different scenarios, a change of a value relationship between the ADC cycle of the image sensor and the H-SYNC cycle affects a frame rate of the image. A larger quantity of H-SYNC cycles corresponding to the ADC cycle of the image sensor leads to a higher frame rate of the image generated by the image sensor.

For example, when the ADC cycle of the image sensor is equal to the H-SYNC cycle, image resolution is 40 megapixels (mega pixel, Mp). When the ADC cycle of the image sensor is twice the H-SYNC cycle, both a length and a width of a unit in which the image sensor performs sampling are twice those in a case in which the ADC cycle is equal to the H-SYNC cycle, and resolution of the image is 10 Mp. A square term of a multiple of the ADC cycle of the image sensor to the H-SYNC cycle is inversely proportional to the resolution of the image generated by the image sensor.

In one ADC cycle, a plurality of sampling units performs sampling at a same time. Because the image sensor performs sampling by rows or columns, if the image sensor is interfered with by a drive signal at a moment, data collected by all the plurality of sampling units that perform sampling at the same time is affected, and consequently, stripes appear in a finally generated image. It is quite difficult to remove the stripes by using an image processing algorithm, and this severely affects final imaging. These stripes can be more easily observed in a dark environment. The dark environment means brightness detected by the image sensor. For example, when the brightness is less than 10 lux, it is considered that this environment is a dark environment.

Figure 12:
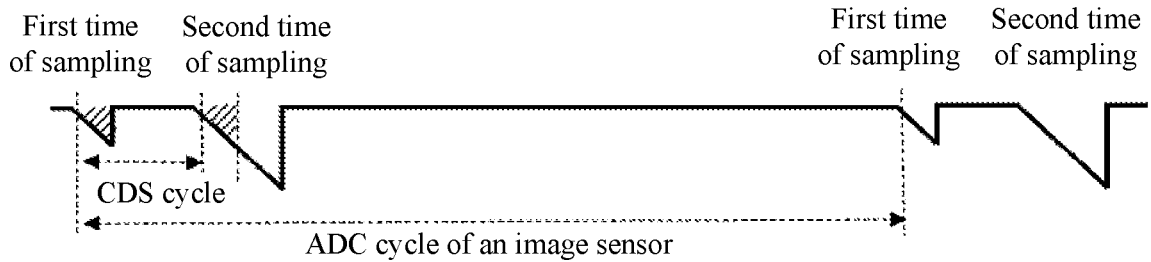
FIG. 12 is a schematic diagram of a sampling voltage of correlated double sampling of an image sensor.

FIG. 12 is a schematic diagram of a sampling voltage of correlated double sampling of an image sensor. A correlated double sampling (correlated double sampling, CDS) technology is a method for eliminating impact caused by noise to the image sensor.

In one ADC cycle of the image sensor, the image sensor performs CDS once, in other words, performs sampling twice. A time difference between a start time point of two times of sampling in the CDS, that is, a cycle interval between two times of sampling in one ADC cycle, may also be referred to as a CDS interval (CDS interval). It should be understood that the ADC cycle is greater than the CDS interval.

Same external magnetic interference has different impact on an analog power supply at different sampling voltages of the image sensor. When the sampling voltage of the image sensor is relatively small, the analog power supply is more susceptible to external electromagnetic interference.

At the first time of sampling, a sampling voltage value is relatively small, a sampling time is relatively short, and the analog power supply is sensitive to external electromagnetic interference. At the second time of sampling, a sampling time is relatively long. At the start of the second time of sampling, a sampling voltage value is relatively small, and the analog power supply is sensitive to external electromagnetic interference. As the sampling voltage value increases, impact caused by same external electromagnetic interference to a generated image decreases. Data obtained in the first time of sampling is used to calibrate data obtained in the second time of sampling. In the correlated double sampling technology, if equal sampling voltages in two times of sampling in CDS cause same interference to the image sensor, the interference does not affect the generated image. For example, after the two times of sampling in the CDS start, within a time equal to that in the first time of sampling, changes of sampling voltages in the two times of sampling with time are the same, and same interference is caused to the image sensor when the image sensor performs the first time of sampling and the second time of sampling. In this case, in the correlated double sampling technology, interference is not embodied in the image generated by the image sensor, in other words, does not affect the image.

When the image sensor outputs a synchronous signal, or within a preset period of time after the image sensor outputs the synchronous signal, the image sensor performs the first time of sampling.

A width of a drive signal output by the controller remains unchanged in one control cycle of the SMA motor. In different control cycles, the width of the drive signal varies with an OIS image stabilization performance requirement or an AF requirement. To eliminate impact caused by the drive signal to the image sensor, a cycle of the drive signal may be adjusted based on the CDS cycle. For example, the CDS cycle is used as the cycle of the drive signal, or an integer multiple of the cycle of the drive signal is equal to the CDS cycle, in other words, a frequency of the drive signal is an integer multiple of a CDS frequency. It should be understood that, "equal to" may alternatively be "approximately equal to" or "roughly equal to".

Because the control cycle of the SMA motor is far greater than the ADC cycle of the image sensor, in the foregoing manner, within a time in which the image sensor performs the first time of sampling, and within a period of time from a start time point of the second time of sampling to a time point reached after a period of time that is equal to a time for the first time of sampling, changes of the drive signal are the same, and the drive signal causes same electromagnetic interference to the first time of sampling and the second time of sampling in the ADC cycle of the image sensor. The interference caused by the drive signal can be eliminated by using a CDS technology.

Figure 13:
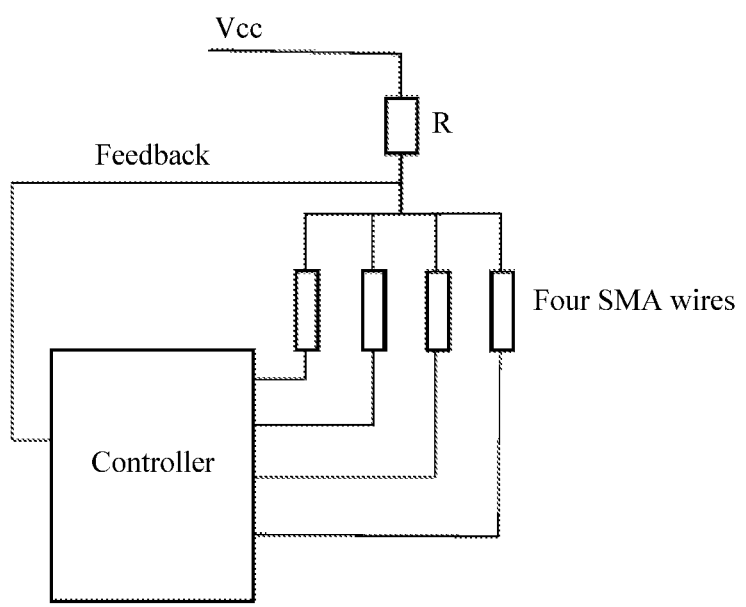
FIG. 13 is a schematic diagram of a control circuit for an SMA motor.

FIG. 13 is a schematic diagram of a control circuit for an SMA motor according to this application.

A length and a cross-sectional area of the SMA wire vary with temperature based on characteristics of an SMA material, so that impedance of the SMA wire changes. Deformation of the SMA wire may be determined based on an electrical performance change caused by an impedance value change of the SMA wire.

For the photographing apparatus, the controller outputs a control signal to drive the SMA motor. When a current generated by the control signal flows through the SMA wire in the SMA motor, the SMA wire heats and deforms. By detecting the impedance change of the SMA wire, the controller may adjust the control signal, and can more accurately control the deformation of the SMA wire.

The impedance change of the SMA wire may be used as feedback to the deformation of the SMA wire, and an element such as a sensor used for measuring temperature or a relative position does not need to be added. Therefore, a quantity of components is reduced, and a volume is reduced.

To determine a deformation status of the SMA wire, each SMA wire may be connected to a voltage divider resistor R in series, to perform voltage division on a power supply Vcc. The voltage divider resistor R may be a constant-value resistor, in other words, the SMA wire and the constant-value resistor may be connected in series to form a voltage division circuit. A voltage is applied to two ends of the circuit composed of the SMA wire and the voltage divider resistor. The impedance of the SMA wire may be determined based on a voltage division status between the SMA wire and the voltage divider resistor R.

The controller outputs a detection signal, and loads the detection signal to two ends of the circuit composed of the SMA wire and the voltage divider resistor. A voltage between two ends of the SMA wire or a voltage of the voltage divider resistor is measured, or the current flowing through the SMA wire is measured, and a feedback signal is formed based on the measured voltage or current to determine the deformation of the SMA wire. The voltage division resistor also plays a protection role to prevent circuit damage caused by an extremely small resistance of the SMA wire and an extremely large current flowing through the SMA wire. The SMA wire is detected based on impedance characteristics of the SMA wire with different deformation. Therefore, the detection signal may also be referred to as an impedance detection signal.

Alternatively, the detection signal may be directly applied to two ends of the SMA wire, the current flowing through the SMA wire is measured, and a feedback signal is formed based on the current flowing through the SMA wire, to determine the deformation of the SMA wire.

Analog-to-digital conversion may be performed on a collected voltage or current signal to form the feedback signal. The feedback signal may reflect the deformation of the SMA wire. A deformation status of the SMA wire may be determined based on a correspondence between the feedback signal and a deformation amount of the SMA wire. The impedance value of the SMA wire may be determined based on the feedback signal, to form feedback on the deformation amount of the SMA wire.

When outputting the detection signal, the controller collects the feedback signal. The detection signal is a pulse signal with a constant voltage value. Therefore, a size of the feedback signal varies with a change in the impedance value of the SMA wire.

A circuit needs to be kept in a stable power-on state during reading of the impedance value. In consideration of accuracy of the feedback signal, a width of the detection signal is usually set to be greater than or equal to a digital-to-analog conversion settling time (ADC settling time) used by the controller for impedance detection. The digital-to-analog conversion settling time used by the controller for impedance detection is a time in which a measured signal needs to remain unchanged when the controller performs impedance detection. To simplify a design, reduce a chip computation amount, and ensure that the width of the detection signal is greater than or equal to the settling time, the width of the detection signal may be set to a fixed value.

It should be noted that for a same SMA wire, the drive signal and the detection signal may be output from a same port of the controller, and occupy different cycles of a PWM signal. In other words, the detection signal and the drive signal are transmitted by the controller in different cycles of the PWM signal. The detection signal may be used as a triggering signal to trigger the controller to collect feedback information. The cycle of the detection signal is far greater than the cycle of the PWM signal.

Figure 14:
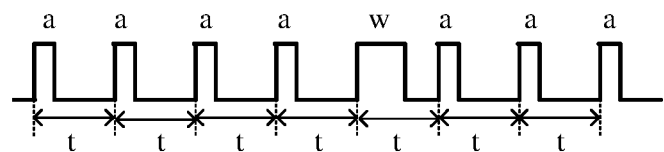
FIG. 14 is a schematic diagram of a pulse signal output by a controller.

FIG. 14 is a schematic diagram of a pulse signal output by a controller.

In one control cycle, widths of drive signals are equal. Based on an AF or OIS requirement, duty cycles of drive signals in different control cycles are adjusted. In other words, widths of drive signals may be different in different control cycles. A width of a detection signal may be a fixed value.

Each time a time t elapses, the controller outputs one pulse signal, where a represents the drive signal, and w represents the detection signal. The controller periodically outputs the pulse signal. The pulse signal includes the drive signal and the detection signal, and t represents a length of a pulse signal cycle. In different control cycles, the width of the detection signal may be a fixed value, and the width of the drive signal may be the same or different.

FIG. 15 is a schematic diagram of a pulse signal output by a controller.

When the image sensor performs correlated double sampling, there is a difference between widths of a detection signal and a drive signal that are output by the controller. Therefore, when the detection signal appears in a time in which the image sensor performs sampling, the signal output by the controller may interfere with the image sensor, and consequently, noise stripes appear in an image generated by the image sensor.

As shown in FIG. 15, a pulse signal cycle generated by the controller is equal to a CDS interval of the image sensor. A pulse signal includes a detection signal and a drive signal. Each time one pulse signal cycle passes, the controller outputs one pulse signal. In one pulse signal cycle, the controller outputs one detection signal or one drive signal. If the image sensor is interfered with by the detection signal when performing sampling for the first time in an ADC cycle of the image sensor, the image sensor is interfered with by the drive signal when performing sampling for the second time. A width of the detection signal is w, and a width of the drive signal is a. Because the width of the detection signal is not equal to the width of the drive signal, impact caused by external magnetic field interference to two times of sampling in CDS performed by the image sensor is unequal. Such interference cannot be offset by using a correlated double sampling technology, and therefore, there are stripe noises in an image generated by the image sensor.

To resolve the foregoing problem, and in comprehensive consideration of noise caused by the drive signal and the detection signal, an embodiment of this application provides a control method for an SMA motor.

FIG. 16 shows a control method for an SMA motor according to an embodiment of this application.

A photographing apparatus includes an image sensor, a lens, a motor, and a controller. The motor includes at least one SMA wire. The SMA wire is configured to deform to drive the lens to move. The controller is configured to output a pulse signal. The pulse signal includes a drive signal and a detection signal, the drive signal is configured to cause a first SMA wire to deform, and the detection signal is configured to detect deformation of the first SMA wire.

In step S1201, the controller outputs a first detection signal in a first time.

In step S1201, the controller outputs a second detection signal in a second time. A width of the first detection signal is equal to a width of the second detection signal.

An interval between a start time point of the first time and a start time point of the second time is equal to a correlated double sampling CDS interval of the image sensor.

The first time corresponds to the first time of sampling in the correlated double sampling performed by the image sensor, and the second time corresponds to the second time of sampling in the correlated double sampling performed by the image sensor.

In other words, when the image sensor performs correlated double sampling once, and sampling voltages in two times of sampling are the same, a voltage value of the first detection signal is equal to a voltage value of the second detection signal. "Equal to" may also be understood as "approximately equal to". It should be understood that changes of the sampling voltages in the two times of sampling with time may be the same or different.

The image sensor performs correlated double sampling once. If a sampling voltage change of the second time of sampling is the same as a sampling voltage change of the first time of sampling within a period of time from a start time point of the second time of sampling to a time point reached after a period of time that is equal to a time for the first time of sampling, a change of the first detection signal is the same as a change of the second detection signal within the time for the first time of sampling and within the period of time from the start time point of the second time of sampling to the time point reached after the period of time that is equal to the time for the first time of sampling.

As shown in FIG. 17, a slope of the sampling voltage in the first time of sampling is equal to a slope of the sampling voltage in the second time of sampling, w represents a width of a detection signal, and a, b, and c separately represent widths of drive signals in three control cycles. In one control cycle, a width of the drive signal remains unchanged. In different control cycles, the width of the drive signal varies with an OIS image stabilization performance requirement or the like. If the first time is within the time for the first time of sampling of the image sensor, and an interval between the first time and a start time point of the first time of sampling of the image sensor is t1, the second time is within a time for the second time of sampling of the image sensor, and an interval between the second time and a start time point of the second time of sampling of the image sensor is t1.

If the first time is before the time for the first time of sampling of the image sensor, the first detection signal ends within the time for the first time of sampling of the image sensor, and an interval between an end time point of the first detection signal and the start time point of the first time of sampling of the image sensor is t2, the second time is before the time for the second time of sampling of the image sensor, the second detection signal ends within the time for the second time of sampling of the image sensor, and an interval between an end time point of the second detection signal and the start time point of the second time of sampling of the image sensor is t2.

If a time period in which the controller outputs the first detection signal includes the time for the first time of sampling of the image sensor, a time period in which the controller outputs the second detection signal includes the period of time from the start time point of the second time of sampling of the image sensor to the time point reached after the period of time that is equal to the time for the first time of sampling.

To meet an impedance measurement requirement, the controller may perform impedance measurement once in a period of time. To resolve a problem of image noise caused when the pulse signal output by the controller may not match a sampling voltage of the image sensor, the controller may correspondingly output two equal-width detection signals in time periods for two times of sampling in CDS performed by the image sensor in one ADC cycle. A time difference between the two detection signals is equal to a CDS interval, in other words, the two detection signals can match the CDS of the image sensor, so that impact caused by the pulse signal to an image is eliminated, and stripe noise is eliminated.

To reduce a difficulty in designing a time sequence for outputting the pulse signal, it is ensured that, in each ADC cycle of the image sensor, if the controller outputs the detection signal, the controller outputs two detection signals in the ADC cycle, and the two detection signals correspond to two times of sampling in CDS performed by the image sensor. In this way, the detection signal may be periodically output, and a detection cycle of the output detection signal is set. One detection cycle corresponds to output of two detection signals, in other words, the controller outputs two detection signals in one detection cycle. One analog-to-digital conversion ADC cycle of the image sensor corresponds to one time of CDS. When the detection cycle is set, the detection cycle of the detection signal is equal to a positive integer multiple of the ADC cycle.

When the detection cycle is set, calculation and configuration of a time sequence for sending the pulse signal are facilitated.

In addition, a start time point of the detection cycle may be adjusted based on a synchronous signal.

A frequency of the pulse signal is determined by the controller based on a clock frequency of the controller. The ADC cycle and the CDS interval of the image sensor are determined based on a clock frequency of the image sensor. The clock frequency of the image sensor and the clock frequency at which the controller outputs the pulse signal may be respectively obtained by the image sensor and the controller by performing processing such as frequency division on a clock signal of a processor of a terminal device. Due to processing performed by the controller and the image sensor on the clock frequency, an error may exist in a multiple relationship between a pulse signal cycle that is set based on the clock frequency of the controller and the ADC cycle and the CDS interval that are determined based on the clock frequency of the image sensor. In other words, there is an error between the CDS interval and an integer multiple of the pulse signal cycle, and there is an error between a positive integer multiple of the ADC cycle and the detection cycle.

When the controller is powered on and runs, a time in which and a frequency at which the controller outputs the pulse signal are set in the foregoing manner. In a running process, as time elapses, an error caused by the clock frequency accumulates. Consequently, only one of two detection signals in one detection cycle appears in a time in which the image sensor performs sampling, and noise stripes are caused.

The controller may adjust the start time point of the detection cycle based on a synchronous signal output by the image sensor. The start time point of the detection cycle is adjusted by using the synchronous signal, to eliminate a time error and avoid noise stripes.

The first SMA wire is an SMA wire in the SMA motor. For another SMA wire in the SMA motor, the foregoing control method may also be used, or another control method is used.

FIG. 18 is a schematic diagram of the pulse signal output by the controller according to an embodiment of this application.

The controller periodically outputs the pulse signal. A time interval between an $i^{th}$ time of outputting a detection signal and an $(i+2)^{th}$ time of outputting the detection signal is referred to as an impedance measurement cycle or a detection cycle.

Each time one pulse signal cycle expires, the controller outputs one pulse signal, and the pulse signal may be a drive signal or a detection signal.

A length of the pulse signal cycle may be adjusted, so that a CDS interval is an integer multiple of the pulse signal cycle. In addition, a start time point of the pulse signal cycle is adjusted, so that a start time point of the pulse signal matches start time points of two times of sampling in CDS of the image sensor.

A length of the detection cycle may be adjusted. In the pulse signal output by the controller, the detection cycle may be an integer multiple of an ADC cycle of the image sensor, so that both two detection signals in each detection cycle can match two times of sampling in CDS of the image sensor, and interference caused by the detection signal to the image sensor is prevented from affecting an image generated by the image sensor. The pulse signal cycle and the detection cycle are set, so that a difficulty in designing a time sequence for outputting the pulse signal can be reduced.

When the CDS interval is N times the pulse signal cycle, there is such a detection signal: A pulse signal in an $N^{th}$ pulse signal cycle after the detection signal is a detection signal. When the CDS interval is N times the pulse signal cycle, for the pulse signal output by the controller, refer to FIG. 18.

FIG. 18 is a schematic diagram of a pulse signal output by a controller according to an embodiment of this application.

The pulse signal cycle of the pulse signal output by the controller is t, in other words, each time a time t elapses, the controller outputs one pulse signal; and w is a width of a detection signal in the pulse signal, and a is a width of a drive signal in the pulse signal in one control cycle.

To enable both two detection signals in the detection cycle to match two times of sampling in CDS of the image sensor, when the CDS interval is twice the pulse signal cycle, there is such a detection signal: A pulse signal in a second pulse signal cycle after the detection signal is a detection signal. A time interval between the detection signal and the subsequent second pulse signal cycle is the CDS interval.

FIG. 19 is a schematic diagram of the pulse signal output by the controller according to an embodiment of this application.

A pulse signal cycle may be equal to a CDS interval. There are two adjacent detection signals in the pulse signal output by the controller. The detection signal is output twice consecutively, and detection signals that are output in two consecutive times match a time in which the image sensor performs two times of sampling in CDS, in other words, the detection signal is output twice in each detection cycle, to eliminate image noise. When the pulse signal cycle is equal to the CDS interval, for the pulse signal output by the controller, refer to FIG. 19.

w represents a width of the detection signal, and the detection signal appears periodically. In a detection cycle, the controller outputs two detection signals, and the two detection signals match a time in which the image sensor performs two times of sampling in CDS.

When the pulse signal cycle may be equal to the CDS interval, two equal-width pulse signals continuously appear in each detection cycle. A width of each of the two pulse signals is different from a width of another pulse signal. The equal-width pulse signals are two detection signals. The two pulse signals are in a same ADC cycle. A time interval between the two pulse signals is equal to the CDS interval.

a and b separately represent widths of drive signals in two control cycles. In one control cycle, a width of the drive signal remains unchanged. In different control cycles, the width of the drive signal varies with an OIS image stabilization performance requirement or the like.

If no external shaking is exerted on a mobile phone during a test, a=b.

If external shaking is exerted on a mobile phone during a test, a and b may be unequal.

Further, output of the pulse signal may be adjusted based on a synchronous signal.

FIG. 20 is a schematic diagram of the pulse signal output by the controller according to an embodiment of this application.

A synchronous signal may be used as a triggering signal to reset a start position of a pulse signal cycle, for example, align the pulse signal with a synchronous signal. If the start position of the pulse signal cycle is reset, a length of the pulse signal cycle is not changed. After the resetting, the controller still outputs the pulse signal based on the previous pulse signal cycle and a previous detection cycle, and the pulse signal includes a detection signal and a drive signal. The synchronous signal may be an H-SYNC signal, or may be a V-SYNC signal.

The controller may adjust the start position of the pulse signal cycle each time the V-SYNC signal is received, or may adjust the start position of the pulse signal cycle each time a fixed quantity of V-SYNC signals are received.

When an integer multiple of a cycle of the H-SYNC signal of the image sensor is equal to an ADC cycle, the controller may adjust the start position of the pulse signal cycle each time a fixed quantity of H-SYNC signals are received. For example, when the ADC cycle is equal to N times the cycle of the H-SYNC signal, the controller may adjust the start position of the pulse signal cycle each time H-SYNC signals whose quantity is an integer multiple of N are received. Adjustment to the start position of the pulse signal cycle may also be understood as adjustment to a start position of the detection cycle.

The image processor may perform the first time of sampling in CDS while outputting the synchronous signal. Alternatively, the image sensor may perform the first time of sampling in CDS when the image sensor outputs the synchronous signal and a preset time interval expires. When receiving the synchronous signal, the controller outputs the detection signal, or the controller adjusts a start time point of the detection cycle, so that the controller outputs the detection signal when the controller receives the synchronous signal and the preset time interval expires. The synchronous signal may be used to indicate the start of the first time of sampling in CDS of the image sensor. When receiving the synchronous signal, the controller adjusts a start time point of the pulse signal cycle. For example, when the controller receives the synchronous signal, the controller outputs a first detection signal, and when the controller receives the synchronous signal and one CDS interval expires, the controller outputs a second detection signal. Therefore, same interference is caused by the pulse signal to two times of sampling in CDS of the image sensor. In other words, the start time point of the pulse signal cycle is adjusted, based on the synchronous signal, to be consistent with a start time point of an ADC cycle of the image sensor.

The controller may be connected to a synchronous signal output interface of the image sensor. When receiving the synchronous signal output by the image sensor, the controller adjusts the start time point of the pulse signal cycle, and then outputs the pulse signal based on a period with a length equal to a length of the pulse signal cycle before the adjustment.

The start time point of the pulse signal cycle is reset by using the synchronous signal, and the start position of the pulse signal cycle is controlled. In this way, the following problem is avoided: Due to setting of the length of the pulse signal cycle and accumulation of errors in ADC cycles of the image sensor with time, a deviation between the detection signal and a sampling time of the image sensor increases, and in an ADC cycle of an image, the detection signal appears only in a time period in which the image sensor performs sampling once. The start time point of the pulse signal cycle is reset by using the synchronous signal, so that a difficulty in controlling design of a time sequence for outputting the pulse signal can be reduced, and stability of eliminating stripe noise in the image is improved in an actual application process. The synchronous signal may be a V-SYNC signal or an H-SYNC signal.

The controller may be a drive chip. A port that is in the image sensor and that is configured to output the V-SYNC signal may be connected to a synchronous (synchronous, SYNC) signal port or an interrupt (interrupt) signal port of the controller. The SYNC signal port or the interrupt signal port of the controller may receive the synchronous signal. The controller may control the start time point of the pulse signal cycle based on the signal received by the SYNC signal port or the interrupt signal port.

FIG. 21 shows a control method for an SMA motor according to an embodiment of this application.

A width of a detection signal is flexibly adjusted, so that impact caused by a pulse signal to an image generated by an image sensor can be eliminated.

A photographing apparatus includes the image sensor, a lens, a motor, and a controller. The motor includes at least one SMA wire. The SMA wire is configured to drive the lens to move. The controller is configured to output a pulse signal. The pulse signal includes a drive signal and a detection signal, the drive signal is configured to cause a first SMA wire to deform, and the detection signal is configured to detect deformation of the first SMA wire.

In step S1601, the controller outputs a first detection signal.

In step S1602, the controller outputs a first drive signal. A width of the first detection signal is equal to a width of the first drive signal, N times a pulse signal cycle is equal to a correlated double sampling CDS cycle of the image sensor, and the first drive signal and the first detection signal are two pulse signals that are adjacent in terms of time.

A frequency of the pulse signal is determined by the controller based on a clock frequency of the controller. An ADC cycle and a CDS interval of the image sensor are determined based on a clock frequency of the image sensor. The clock frequency of the image sensor and the clock frequency at which the controller outputs the pulse signal may be respectively obtained by the image sensor and the controller by performing processing such as frequency division on a clock signal of a processor of a terminal device. Due to processing performed by the controller and the image sensor on the clock frequency, an error may exist in a multiple relationship between the CDS interval determined based on the clock frequency of the image sensor and a pulse signal cycle that is set based on the clock frequency of the controller. There is a specific difference between interference caused to the first time of sampling and interference caused to the second time of sampling in correlated double sampling of the image sensor, in other words, noise stripes may exist in a generated image.

The controller adjusts a start time point of a detection cycle based on a synchronous signal output by the image sensor, so that a difference between a time used by the controller to output the first detection signal and a time for outputting the synchronous signal is equal to a preset value, a cycle of the synchronous signal is equal to a positive integer multiple of an analog-to-digital conversion ADC cycle of the image sensor, one ADC cycle of the image sensor corresponds to one time of CDS, and one detection cycle corresponds to output of one detection signal.

The synchronous signal may be an H-SYNC signal, or may be a V-SYNC signal.

Human eyes pay more attention to moving objects than to still objects. The start time point of the detection cycle is adjusted based on the synchronous signal of an image processor, so that noise stripes appear at relatively fixed positions in the image. In this way, attention to stripe noise by human eyes is reduced, and user experience is improved.

FIG. 22 is a schematic diagram of the pulse signal output by the controller according to an embodiment of this application.

A reason why the detection signal introduces stripe noise to the image is that a pulse width of the detection signal is unequal to a pulse width of the drive signal, and consequently, different interference is caused to two times of sampling in one ADC cycle of the image sensor, and noise offset is incomplete.

Before the detection signal, a width of the drive signal output by the controller is a, and a width w of the detection signal is set to w=a. Each time the detection signal is output, it is ensured that a width of the signal is equal to a width of one or more drive signals before or after the signal. The width of the detection signal is adjusted based on the width of the drive signal, so that the pulse signal matches two times of sampling in CDS sampling, and stripe noise can be eliminated.

If a width of a drive signal in a first control cycle is a, a width of a detection signal in the first control cycle is also a. If a width of a drive signal in a second control cycle is b, a width of a detection signal in the second control cycle is also b. If a width of a drive signal in a third control cycle is c, a width of a detection signal in the third control cycle is also c.

When a mobile phone is shaken continuously, a width of the pulse signal changes periodically. A changing cycle of the width of the pulse signal is a control period. A quantity of pulse signals in each cycle is the same. In other words, a quantity of consecutive equal-width pulse signals is equal.

FIG. 23 is a schematic diagram of the pulse signal output by the controller according to an embodiment of this application.

A reason why the detection signal introduces stripe noise to the image is that a width of the detection signal is unequal to a width of the drive signal, and consequently, different interference is caused to two times of sampling in one ADC cycle of the image sensor, and noise offset is incomplete.

The width of the detection signal is set to be equal to a pulse width of a drive signal before the detection signal and a pulse width of a drive signal after the detection signal, in other words, it is ensured that the detection signal and the drive signal cause same interference to two times of sampling in a same ADC cycle of the image sensor. A width of the pulse signal may also be referred to as a pulse width, and is used to indicate duration of the pulse signal. After algorithm processing performed by the image sensor, noise caused by same interference in two times of sampling in the same ADC cycle may be offset. Therefore, stripe noise is not displayed on a final image. Widths of drive signals output by the controller in three control cycles are separately a, b, and c, and the width of the detection signal output by the controller is equal to a width of a drive signal in a control cycle in which the detection signal is located.

The width of the detection signal is set to be equal to the width of the drive signal before the detection signal and the width of the drive signal after the detection signal, so that a limitation on a time for outputting the detection signal can be reduced, and a difficulty in designing a time sequence of the pulse signal can be reduced.

Figure 24:
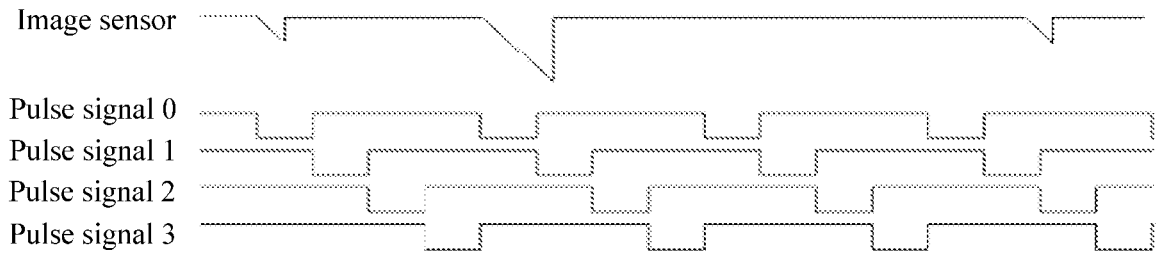
FIG. 24 is a schematic diagram of a pulse signal output by a controller according to an embodiment of this application.

FIG. 24 is a schematic diagram of the pulse signal output by the controller according to an embodiment of this application.

Pulse signals 0 to 3 are separately used to drive four SMA wires in the SMA motor. A pulse signal cycle of the pulse signal output by the controller is set to be equal to the CDS interval, and a width of a detection signal in the pulse signal is set to be equal to a width of one or more drive signals before or after the detection signal, so that noise, in an image generated by the image sensor, caused by the detection signal in the pulse signal can be eliminated.

Corresponding to each SMA wire, the controller may output pulse signals with equal pulse signal cycles to perform control, so that a difficulty in designing a time sequence is reduced. To reduce requirements of a plurality of SMA wires for a maximum value of a current of a power supply, the controller may adjust start time points of pulse signal cycles corresponding to the plurality of SMA wires, so that pulse signals corresponding to the plurality of SMA wires are output at different time points.

For example, an ADC cycle of an image sensor of a specific model in a specific use scenario is 14.1 µs, and a CDS interval of the image sensor is approximately 3.135 µs. The SMA motor is a four-wire SMA motor. For each SMA wire, a pulse signal cycle of the SMA motor may be set to be equal to the CDS interval, in other words, the pulse signal cycle is 3.135 µs, and a frequency is 318.9 kHz. Pulse signals of the four SMA wires have a same pulse signal cycle and can be output at a same time point or at different time points.

Further, the start time point of the pulse signal cycle may be adjusted based on a synchronous signal of the image sensor, so that noise stripes appear at relatively fixed positions in the image, attention to stripe noise by human eyes is reduced, and user experience is improved.

Figure 25:
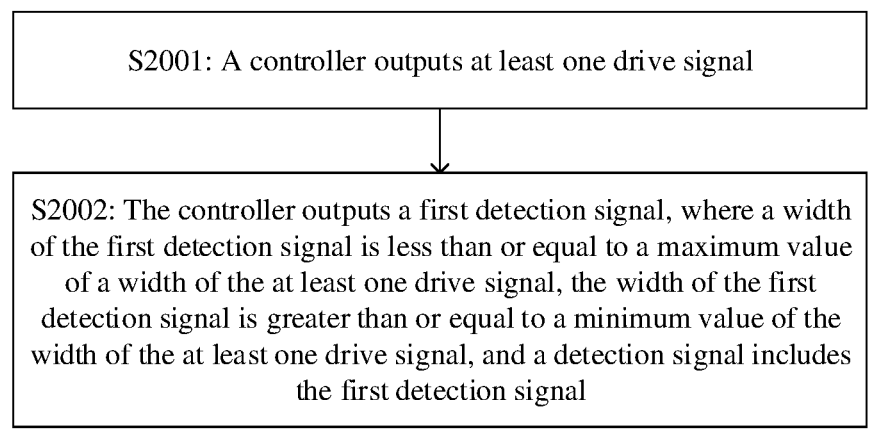
FIG. 25 is a schematic flowchart of a pulse method output by a controller according to an embodiment of this application.

FIG. 25 is a schematic flowchart of a control method for an SMA motor according to an embodiment of this application.

A feedback signal is obtained based on an impedance value of an SMA wire. Therefore, when reading the feedback signal, a controller needs to keep a line in which the SMA wire is located in a stable power-on state. To reach the stable power-on state, a pulse width of a detection signal is usually set to be comparatively wide. The pulse width of the detection signal is comparatively wide, and a pulse width of a drive signal is comparatively narrow. In some cases, the pulse width of the detection signal may be much wider than the width of the drive signal, for example, may be a multiple of the pulse width of the drive signal. When an image sensor performs sampling, the controller generates the detection signal. Because there is a relatively large difference between the pulse width of the drive signal and the pulse width of the detection signal, when the detection signal and the drive signal respectively appear in time periods for two times of sampling in correlated double sampling of the image sensor, the detection signal and the drive signal cause different interference to the image sensor. This affects a generated image, and noise stripes appear in the image. The pulse width of the detection signal may be properly set to reduce impact caused by the pulse signal to an image generated by the image sensor.

A value of the pulse width of the detection signal may be set to a relatively small value. With the development of the controller, an ADC settling time used by the controller for impedance detection is reduced. Therefore, the value of the width of the detection signal may be approximately equal to the width of the drive signal, to reduce impact caused by the detection signal to the image generated by the image sensor.

In different control cycles, the width of the drive signal varies with an OIS image stabilization performance requirement or the like. In other words, the pulse width of the drive signal may be different in different control cycles. Therefore, different interference may be caused to the image sensor by a detection signal of a fixed pulse width when the image sensor performs sampling. To reduce interference caused by the pulse signal to the image generated by the image sensor, the width of the detection signal output by the controller may be greater than a minimum value of the pulse width of the drive signal, and is less than a maximum value of the pulse width of the drive signal.

A photographing apparatus includes an image sensor, a lens, a motor, and a controller. The motor includes at least one SMA wire, the at least one SMA wire is configured to deform to drive the lens to move, the controller is configured to output a pulse signal, the pulse signal includes a drive signal and a detection signal, the drive signal is used to cause a first SMA wire in the at least one SMA wire to deform, the detection signal is used to detect deformation of the first SMA wire, N times a pulse signal cycle is equal to a time difference between the first time of sampling and the second time of sampling in correlated double sampling CDS of the image sensor, and N is a positive integer.

The controller outputs at least one drive signal and a first detection signal, a width of the first detection signal is less than or equal to a maximum value of a width of the at least one drive signal, the width of the first detection signal is greater than or equal to a minimum value of the width of the at least one drive signal, and the detection signal includes the first detection signal.

The width of the first detection signal is adjusted to a value close to the width of the drive signal, so that noise stripes that may be caused by the first detection signal can be reduced. To reduce noise stripes in the entire image, a width of each detection signal output by the controller may be adjusted.

The controller outputs a pulse signal, and the pulse signal includes at least one detection signal and at least one drive signal. The drive signal is used to cause the SMA wire to deform, and the detection signal is used to detect deformation of the SMA wire. An integer multiple of the pulse signal is equal to a CDS interval, a width of each detection signal in a plurality of detection signals is less than or equal to the maximum value of the width of the at least one drive signal, and the width of the first detection signal is greater than or equal to the minimum value of the width of the at least one drive signal.

The at least one detection signal may have equal or unequal widths.

A single power-on time of the detection signal is reduced, so that the width of the detection signal is adjusted to a value close to the width of the pulse signal. In this way, a possibility of causing different interference to two times of sampling in correlated double sampling of the image sensor is reduced, and an interference difference can be reduced, so that stripe noise in the image generated by the image sensor can be reduced. The width of the detection signal output by the controller may be set to be equal to or slightly less than an average value of pulse widths of drive signals.

The controller adjusts a start time point of the detection cycle based on a synchronous signal output by the image sensor, so that a difference between a time used by the controller to output the first detection signal and a time for outputting the synchronous signal is equal to a preset value, a cycle of the synchronous signal is equal to a positive integer multiple of an analog-to-digital conversion ADC cycle of the image sensor, one ADC cycle of the image sensor corresponds to one time of CDS, and one detection cycle corresponds to output of one detection signal.

Human eyes are more sensitive to moving objects. In other words, the human eyes pay more attention to an object whose position changes. A start time point of the pulse signal is reset based on the synchronous signal. For different frames of images, stripes appear at fixed positions in each frame of image, in other words, stripes appear only in some specific rows or columns. In the manner of resetting the start time point of the pulse signal based on the synchronous signal, noise stripes can appear at relatively fixed positions in the image. In this way, attention to stripe noise by human eyes is reduced, and user experience is improved.

Figure 26:
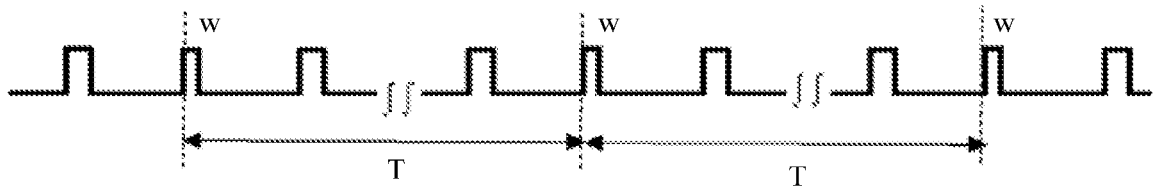
FIG. 26 is a schematic diagram of a pulse signal output by a controller according to an embodiment of this application.

FIG. 26 is a schematic diagram of the pulse signal output by the controller according to an embodiment of this application.

The controller periodically outputs the pulse signal. Widths of drive signals in each control cycle are equal, and widths of drive signals in different control cycles may be different. After each time interval T, the controller outputs one detection signal. To reduce a difficulty in designing a time sequence used by the controller to output the pulse signal, the controller may output a detection signal of a fixed width. In a waveform output by the controller, each time an equal time interval T expires, there is one pulse waveform with a fixed width of w. The pulse signal is the detection signal.

Figure 27:
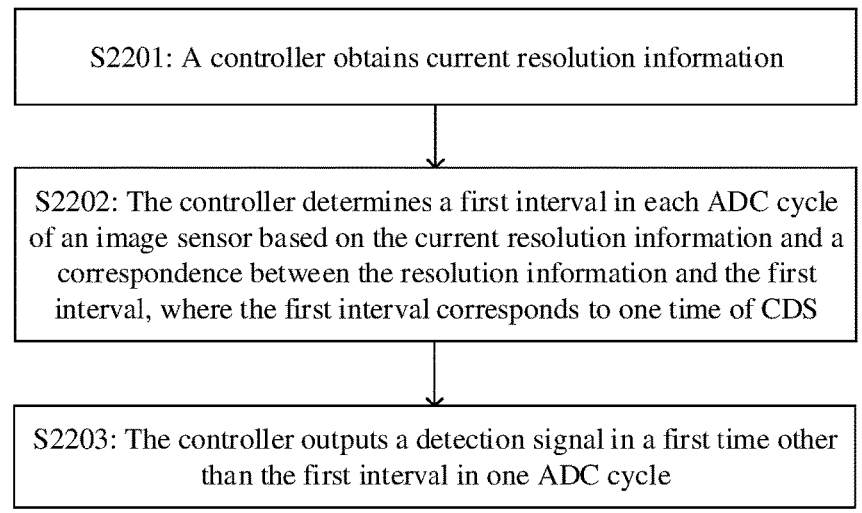
FIG. 27 shows a control method for an SMA motor according to an embodiment of this application.

FIG. 27 shows a control method for an SMA motor according to an embodiment of this application.

A detection signal is output in an insensitive area in an ADC cycle of an image sensor, and noise stripes can be prevented from appearing in a generated image.

The image sensor performs sampling twice in one ADC cycle. During the two times of sampling, the image sensor collects received light. In this case, if interference (including but not limited to interference caused by a drive signal and an impedance measurement signal) is caused, noise generated by the interference is collected, and this may affect the image generated by the image sensor.

In an ADC cycle of the image sensor, a time area other than a time area in which the image sensor performs sampling may be referred to as a secure area, in other words, an insensitive area. In other words, in the secure area, the image sensor does not perform sampling. When the image sensor is located in the secure area, the image sensor is insensitive to external interference, and even if interference exists, the interference is not displayed in the image because the image sensor performs sampling in the area. Therefore, in the secure area, pulse signal output of the controller does not affect an image effect.

Some image sensors can collect images with different resolution. When a CDS interval remains unchanged, and a sampling time length for performing CDS each time remains unchanged, lower resolution of the generated image leads to a longer ADC cycle of the image sensor and a longer time of the secure area in one ADC cycle.

Figure 28:
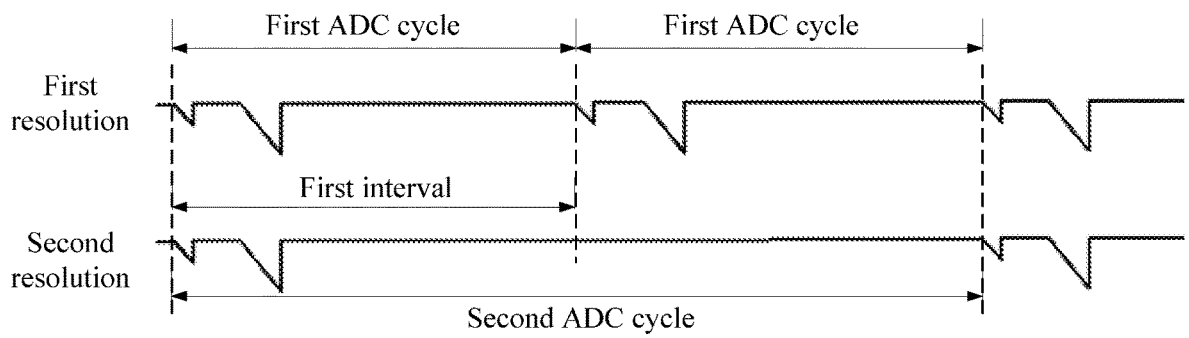
FIG. 28 is a schematic diagram of a sampling voltage of correlated double sampling of an image sensor.

As shown in FIG. 28, for different image resolution, ADC cycles of the image sensor are different. First resolution is higher than second resolution. The first resolution corresponds to a first ADC cycle of the image sensor, the second resolution corresponds to a second ADC cycle of the image sensor, and the second ADC cycle is greater than the first ADC cycle.

After the ADC cycle starts, the image sensor starts to perform sampling after an equal time. Because the CDS interval remains unchanged, the image sensor does not perform sampling within a time by which the second ADC cycle is longer than the first ADC cycle, in other words, within a time remained after one first ADC cycle passes in the second ADC cycle. Therefore, this part of time is the secure area. For different resolution, if the image sensor starts to perform CDS in an equal time after the ADC cycle starts, for the second resolution, a time interval in one ADC cycle after a time corresponding to the first ADC cycle is the secure area.

A square term of a multiple of the ADC cycle of the image sensor to an H-SYNC cycle is inversely proportional to resolution of an image generated by the image sensor. For example, the second ADC cycle is twice the first ADC cycle, the first resolution is 40 Mp, the second resolution is 10 Mp, and the first resolution is twice the second resolution. When the second resolution is used, a second half of the ADC cycle is the secure area. In other words, the secure area of the image sensor may be determined based on the resolution.

A photographing apparatus includes an image sensor, a lens, a motor, and a controller, the motor includes at least one SMA wire. The SMA wire is configured to deform to drive the lens to move. The controller is configured to output a pulse signal, and the pulse signal includes a detection signal and a drive signal. The drive signal is used to cause a first SMA wire in the at least one SMA wire to deform, and the detection signal is used to detect deformation of the first SMA wire. An integer multiple of a pulse signal cycle is equal to a CDS interval of the image sensor. A time for outputting the detection signal is a time other than a time in which the image sensor performs sampling.

In other words, when the controller outputs the detection signal, the image sensor does not perform sampling. Therefore, the detection signal does not appear in a time period in which the image sensor performs sampling, and does not affect an image generated by the image sensor.

In step S2201, the controller obtains current resolution information.

The current resolution information may be used to indicate resolution of an image generated in a current sampling manner of the image sensor. The current resolution information may be entered by a user, or may be set based on a program.

In step S2202, the controller may determine a first interval in each ADC cycle of the image sensor based on the current resolution information and a correspondence between the resolution information and the first interval, where the first interval corresponds to one time of CDS performed by the image sensor.

The first interval may also be referred to as a sensitive area. When the image sensor performs sampling, interference may be reflected in the generated image. A time in which the image sensor performs sampling is a sensitive area of the image sensor. The first interval includes the time in which the image sensor performs sampling.

For an image sensor that uses a correlated double sampling technology, the first interval includes a time used by the image sensor to perform sampling twice in one ADC cycle.

Due to impact caused by an external environment or the like, a time length of a sampling time may change. The first interval may be set to include the sampling time and a specific reserved time before and/or after the sampling time.

For example, for an image sensor that uses a complementary metal-oxide-semiconductor (complementary metal-oxide-semiconductor, CMOS) process, maximum resolution is N times the current resolution, and duration of the first interval may be 1/N of the ADC cycle. In other words, in different resolution, CDS is performed immediately after the ADC cycle starts, or CDS is started at a preset interval. In this case, in current resolution, after the ADC cycle starts, after a time of 1/N of the ADC cycle passes, the image sensor does not perform sampling, and a time of first 1/N of the ADC cycle may be the first interval.

In step S2203, the controller outputs the detection signal at an interval other than the first interval in one ADC cycle.

The correspondence between the resolution information and the first interval may be preset.

The controller may determine, based on a numerical relationship between the current resolution and maximum resolution of the image sensor, first intervals corresponding to different resolution.

A frequency of the pulse signal is an integer multiple of the CDS interval, so that it can be ensured that the drive signal causes same interference to two times of sampling in one ADC cycle of the image sensor.

The controller outputs a plurality of detection signals. To reduce a difficulty in designing a time sequence of the pulse signal, deformation of the SMA wire may be periodically detected, in other words, the controller may periodically output the detection signal. A cycle of the detection signal may be an integer multiple of one ADC cycle of the image sensor. The cycle of the detection signal is set to the integer multiple of the ADC cycle of the image sensor, so that a time for outputting the detection signal in the ADC cycle of the image sensor remains unchanged, in other words, detection signals appear at a same or fixed phase in the ADC cycle of the image sensor, so that the detection signal is output in a secure area.

When the controller starts to run, the controller and the image sensor are configured, so that the controller determines a start time point of the ADC cycle of the image sensor. For example, a start time point of the first time of sampling in CDS performed by the image sensor may be used as the start time point of the ADC cycle.

There may be an error when a detection cycle is set, and the detection cycle is not exactly equal to the integer multiple of the ADC cycle. The controller may adjust a start time point of the detection cycle based on a synchronous signal output by the image sensor. The start time point of the detection cycle is adjusted by using the synchronous signal, to avoid the following case: Due to accumulation of time and a phase change of the detection signal, the detection signal is output when the image sensor is performing sampling.

The image sensor outputs V-SYNC, and V-SYNC is used to indicate that the image sensor starts to collect a frame of image. The controller may determine the start time point of the ADC cycle of the image sensor based on the V-SYNC, to determine the sensitive area.

Figure 29:
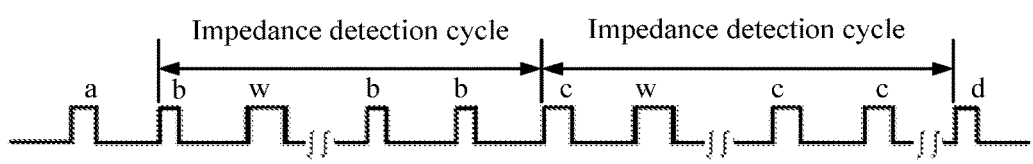
FIG. 29 is a schematic diagram of a pulse signal output by a controller according to an embodiment of this application.

FIG. 29 is a schematic diagram of the pulse signal output by the controller according to an embodiment of this application.

In an output waveform of the pulse signal, a, b, c and d are separately used to represent pulse widths of drive signals in different control cycles. The control cycle may be the same as or different from the detection cycle. There is one pulse signal of a fixed width in every N pulse signals output by the controller, and the pulse signal of the fixed width is the detection signal. A width of the detection signal is fixed, and w is used to indicate a pulse width of the detection signal. A time interval at which detection signals appear is fixed, and the time interval is the detection cycle. The pulse signal cycle and the detection cycle may be set, so that the following is achieved:

Pulse signal cycle×$M$=CDS interval of the image sensor; and

Detection cycle=Pulse signal cycle×$N$=ADC cycle of the image sensor×$P$; where

M, N, and P each are a positive integer.

The pulse signal cycle and the detection cycle are set, so that a difficulty in designing a time sequence used by the controller to output the pulse signal is reduced.

Figure 30:
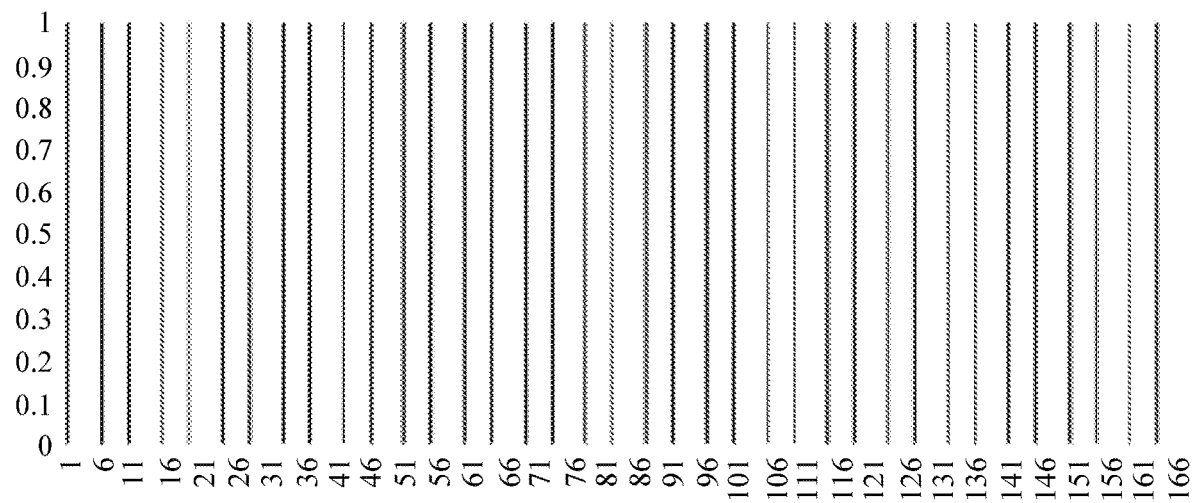
FIG. 30 is a schematic diagram of a sensitive area of an image sensor.

FIG. 30 is a schematic diagram of the sensitive area of the image sensor.

A horizontal axis indicates time, and a vertical axis indicates whether an area is a sensitive area of the image sensor. 1 indicates that the image sensor is sensitive to interference, in other words, a time corresponding to 1 is a time in which the image sensor performs sampling. 0 indicates that the image sensor is not sensitive to interference, in other words, a time corresponding to 0 is a time in which the image sensor does not perform sampling.

Figure 31:
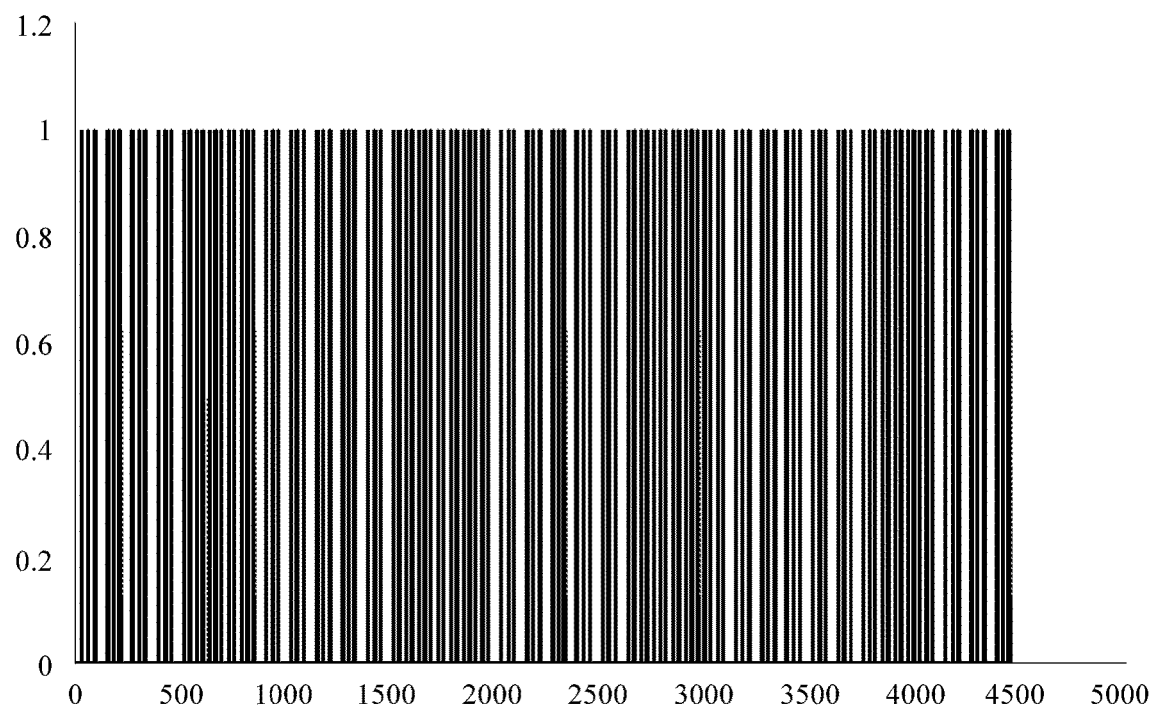
FIG. 31 is a schematic diagram of a stripe status of an image generated by an image sensor.

FIG. 31 is a schematic diagram of a stripe status of an image generated by the image sensor.

A horizontal axis indicates time, and a vertical axis indicates a stripe status. A stripe state 0 indicates that there is no stripe, and a stripe state 1 indicates that there are stripes. Because a width of the detection signal is unequal to a width of the drive signal, when the image sensor performs sampling, the controller outputs the detection signal. Consequently, there may be noise stripes in an image output by the image sensor.

A time in which the controller outputs the detection signal is adjusted. In an insensitive area of the image sensor, the controller outputs the detection signal.

Current resolution is ¼ of highest resolution of the image sensor. Therefore, an ADC cycle corresponding to the current resolution is twice larger than an ADC cycle corresponding to the highest resolution. The image sensor immediately performs CDS sampling after the ADC cycle begins. Therefore, the image sensor does not perform sampling in a last half time of the ADC cycle corresponding to the current resolution. Last 40% of the ADC cycle corresponding to the current resolution may be set as a secure area, that is, an insensitive area. In this area, the controller can output the detection signal.

Figure 32:
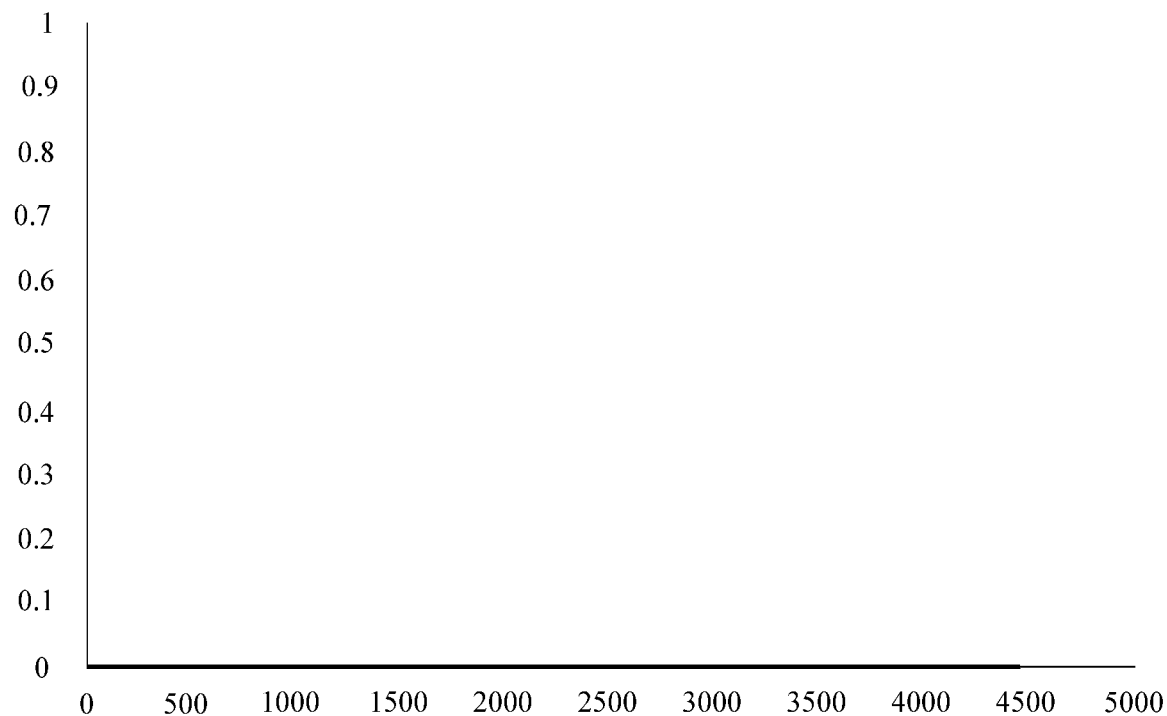
FIG. 32 is a schematic diagram of a stripe status of an image generated by an image sensor.

FIG. 32 is a schematic diagram of a stripe status of an image generated by the image sensor.

The pulse signal cycle is adjusted. The pulse signal cycle is set to be equal to a CDS interval of the image sensor, the detection cycle is set to be equal to 144 CDS cycles, and in addition, the detection cycle is equal to 32 ADC cycles of the image sensor. A time for outputting the detection signal is adjusted, or the start time point of the detection cycle is adjusted, so that the detection signal is output in an insensitive area of the image sensor.

A horizontal axis indicates time, and a vertical axis indicates a stripe status. A stripe state 0 indicates that there is no stripe, and a stripe state 1 indicates that there are stripes. It can be learned that when a time in which the controller outputs the detection signal is adjusted, noise stripes in an image output by the image sensor are eliminated.

Figure 33:
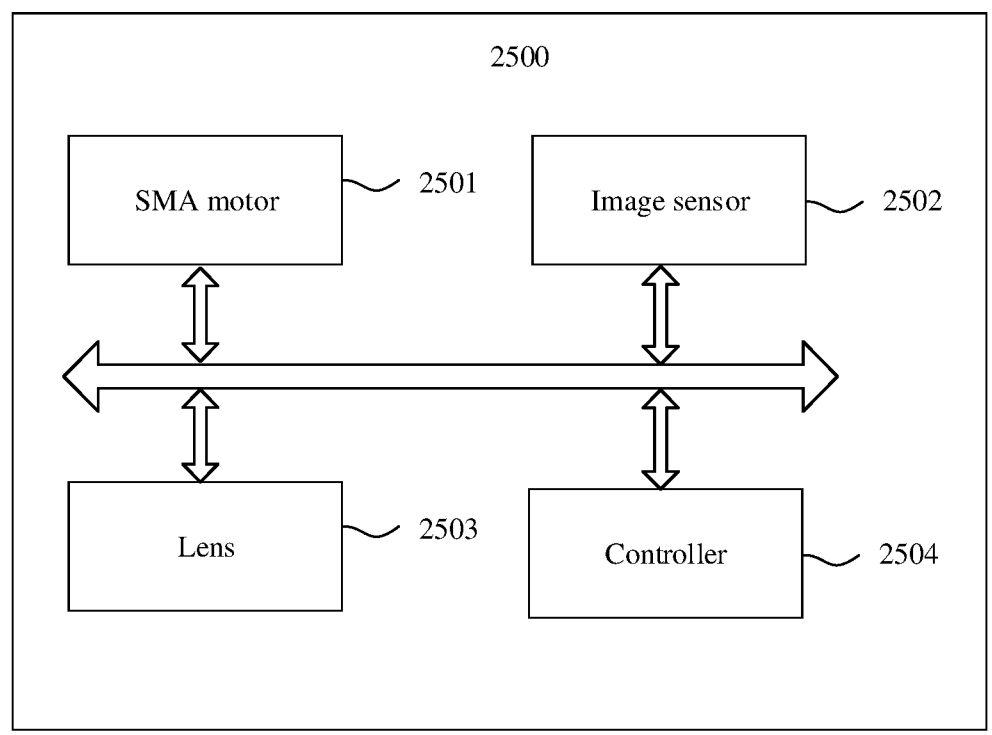
FIG. 33 is a schematic structural diagram of a photographing apparatus according to an embodiment of this application.

FIG. 33 is a schematic structural diagram of a photographing apparatus according to an embodiment of this application.

An apparatus 2500 includes a shape memory alloy SMA motor 2501, an image sensor 2502, a lens 2503, and a controller 2504, the SMA motor 2501 includes at least one SMA wire, and the at least one SMA wire is configured to deform to drive the lens 2503 to move.

In some embodiments, the controller 2504 is configured to output a pulse signal, where the pulse signal includes a drive signal and a detection signal, the drive signal is used to cause a first SMA wire in the at least one SMA wire to deform, the detection signal is used to detect deformation of the first SMA wire, N times a pulse signal cycle is equal to a time difference between the first time of sampling and the second time of sampling in correlated double sampling CDS of the image sensor 2502, and N is a positive integer.

The detection signal includes a first detection signal and a second detection signal, a pulse width of the first detection signal is equal to a pulse width of the second detection signal, the first detection signal is output in a first time, the second detection signal is output in a second time, the first time corresponds to the first time of sampling, and the second time corresponds to the second time of sampling.

Optionally, one analog-to-digital conversion ADC cycle of the image sensor 2502 corresponds to one time of CDS, a detection cycle of the detection signal is equal to a positive integer multiple of the ADC cycle, and one detection cycle corresponds to output of two detection signals.

Optionally, the controller 2504 is further configured to adjust a start time point of the detection cycle based on a synchronous signal output by the image sensor 2502, so that a difference between the first time and a time for outputting the synchronous signal is equal to a preset value, a cycle of the synchronous signal is equal to a positive integer multiple of the ADC cycle, one ADC cycle of the image sensor 2502 corresponds to one time of CDS, and one detection cycle corresponds to output of two detection signals.

In some embodiments, the controller 2504 is configured to output a pulse signal, where the pulse signal includes a drive signal and a detection signal, the drive signal is used to cause a first SMA wire in the at least one SMA wire to deform, the detection signal is used to detect deformation of the first SMA wire, N times a pulse signal cycle is equal to a time difference between the first time of sampling and the second time of sampling in correlated double sampling CDS of the image sensor 2502, and N is a positive integer.

The drive signal includes a first drive signal.

The detection signal includes a first detection signal, a width of the first detection signal is equal to a width of the drive signal, and the first detection signal is a signal in a preset time range before or after the first drive signal.

Optionally, the controller 2504 is further configured to adjust a start time point of a detection cycle based on a synchronous signal output by the image sensor 2502, so that a difference between a time for outputting the first detection signal and a time for outputting the synchronous signal is equal to a preset value, a cycle of the synchronous signal is equal to a positive integer multiple of an analog-to-digital conversion ADC cycle of the image sensor 2502, one ADC cycle of the image sensor 2502 corresponds to one time of CDS, and one detection cycle corresponds to output of one detection signal.

In some embodiments, the controller 2504 is configured to output a pulse signal, where the pulse signal includes at least one drive signal and at least one detection signal, the drive signal is used to cause a first SMA wire in the at least one SMA wire to deform, the detection signal is used to detect deformation of the first SMA wire, N times a pulse signal cycle is equal to a time difference between the first time of sampling and the second time of sampling in correlated double sampling CDS of the image sensor 2502, and N is a positive integer.

The at least one detection signal includes a first detection signal, a width of the first detection signal is less than or equal to a maximum value of a width of the at least one drive signal, the width of the first detection signal is greater than or equal to a minimum value of the width of the at least one drive signal, and the detection signal includes the first detection signal.

Optionally, the controller 2504 is further configured to adjust a start time point of the detection cycle based on a synchronous signal output by the image sensor 2502, so that a difference between a time for outputting the first detection signal and a time for outputting the synchronous signal is equal to a preset value, a cycle of the synchronous signal is equal to a positive integer multiple of an analog-to-digital conversion ADC cycle of the image sensor, one ADC cycle of the image sensor 2502 corresponds to one time of CDS, and one detection cycle corresponds to output of one detection signal.

In some embodiments, the controller 2504 is configured to output a pulse signal, where the pulse signal includes a drive signal and a detection signal, the drive signal is used to cause a first SMA wire in the at least one SMA wire to deform, the detection signal is used to detect deformation of the first SMA wire, N times a pulse signal cycle is equal to a time difference between the first time of sampling and the second time of sampling in correlated double sampling CDS of the image sensor 2502, and N is a positive integer.

The controller 2504 is configured to obtain current resolution information.

The controller 2504 is further configured to determine a first interval in each ADC cycle of the image sensor 2502 based on the current resolution information and a correspondence between the resolution information and the first interval, where the first interval corresponds to one time of CDS.

The controller 2504 is further configured to output the detection signal in a first time other than the first interval in one ADC cycle.

Optionally, one analog-to-digital conversion ADC cycle of the image sensor 2502 corresponds to one time of CDS, a detection cycle of the detection signal is equal to a positive integer multiple of the ADC cycle, and one detection cycle corresponds to output of one detection signal.

Optionally, the controller 2504 is further configured to adjust a start time point of the detection cycle based on a synchronous signal output by the image sensor 2502, so that a difference between the first time and a time for outputting the synchronous signal is equal to a preset value, a cycle of the synchronous signal is equal to a positive integer multiple of the ADC cycle, one ADC cycle of the image sensor 2502 corresponds to one time of CDS, and one detection cycle corresponds to output of one detection signal.

Figure 34:
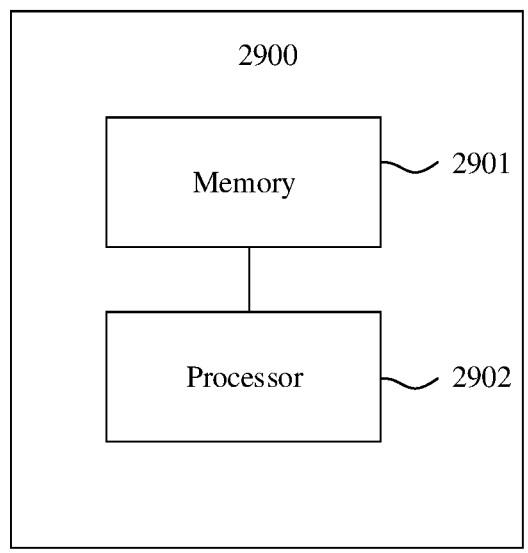
FIG. 34 is a schematic structural diagram of a photographing apparatus according to another embodiment of this application.

FIG. 34 is a schematic structural diagram of a control apparatus in a photographing apparatus according to an embodiment of this application.

The photographing apparatus includes an SMA motor, an image sensor, a lens, and a control apparatus 2900, the SMA motor includes at least one SMA wire, and the at least one SMA wire is configured to deform to drive the lens to move.

The control apparatus 2900 includes a memory 2901 and a processor 2902.

The memory 2901 is configured to store a program.

In some embodiments, when the program is executed, the processor 2902 is configured to output a pulse signal, where the pulse signal includes a drive signal and a detection signal, the drive signal is used to cause a first SMA wire in the at least one SMA wire to deform, the detection signal is used to detect deformation of the first SMA wire, N times a pulse signal cycle is equal to a time difference between the first time of sampling and the second time of sampling in correlated double sampling CDS of the image sensor, and N is a positive integer.

The processor 2902 is configured to output a first detection signal in a first time, where the first time corresponds to the first time of sampling.

The processor 2902 is configured to output a second detection signal in a second time, where a pulse width of the second detection signal is equal to a pulse width of the first detection signal, the second time corresponds to the second time of sampling, and the detection signal includes the first detection signal and the second detection signal.

Optionally, one analog-to-digital conversion ADC cycle of the image sensor corresponds to one time of CDS, a detection cycle of the detection signal is equal to a positive integer multiple of the ADC cycle, and one detection cycle corresponds to output of two detection signals.

Optionally, the processor 2902 is further configured to adjust a start time point of the detection cycle based on a synchronous signal output by the image sensor, so that a difference between the first time and a time for outputting the synchronous signal is equal to a preset value, a cycle of the synchronous signal is equal to a positive integer multiple of the ADC cycle, one ADC cycle of the image sensor corresponds to one time of CDS, and one detection cycle corresponds to output of two detection signals.

In some embodiments, when the program is executed, the processor 2902 is configured to output a pulse signal, where the pulse signal includes a drive signal and a detection signal, the drive signal is used to cause a first SMA wire in the at least one SMA wire to deform, the detection signal is used to detect deformation of the first SMA wire, N times a pulse signal cycle is equal to a time difference between the first time of sampling and the second time of sampling in correlated double sampling CDS of the image sensor, and N is a positive integer.

The processor 2902 is configured to output a first drive signal, where the drive signal includes the first drive signal.

The processor 2902 is configured to output a first detection signal, where a width of the first detection signal is equal to a width of the drive signal, the first detection signal is a signal in a preset time range before or after the first drive signal, and the detection signal includes the first detection signal.

Optionally, the processor 2902 is further configured to adjust a start time point of a detection cycle based on a synchronous signal output by the image sensor, so that a difference between a time for outputting the first detection signal and a time for outputting the synchronous signal is equal to a preset value, a cycle of the synchronous signal is equal to a positive integer multiple of an analog-to-digital conversion ADC cycle of the image sensor, one ADC cycle of the image sensor corresponds to one time of CDS, and one detection cycle corresponds to output of one detection signal.

In some embodiments, when the program is executed, the processor 2902 is configured to output a pulse signal, where the pulse signal includes a drive signal and a detection signal, the drive signal is used to cause a first SMA wire in the at least one SMA wire to deform, the detection signal is used to detect deformation of the first SMA wire, N times a pulse signal cycle is equal to a time difference between the first time of sampling and the second time of sampling in correlated double sampling CDS of the image sensor, and N is a positive integer.

The processor 2902 is configured to output at least one drive signal.

The processor 2902 is configured to output a first detection signal, where a width of the first detection signal is less than or equal to a maximum value of a width of the at least one drive signal, the width of the first detection signal is greater than or equal to a minimum value of the width of the at least one drive signal, and the detection signal includes the first detection signal.

Optionally, the processor 2902 is further configured to adjust a start time point of the detection cycle based on a synchronous signal output by the image sensor, so that a difference between a time for outputting the first detection signal and a time for outputting the synchronous signal is equal to a preset value, a cycle of the synchronous signal is equal to a positive integer multiple of an analog-to-digital conversion ADC cycle of the image sensor, one ADC cycle of the image sensor corresponds to one time of CDS, and one detection cycle corresponds to output of one detection signal.

In some embodiments, when the program is executed, the processor 2902 is configured to output a pulse signal, where the pulse signal includes a drive signal and a detection signal, the drive signal is used to cause a first SMA wire in the at least one SMA wire to deform, the detection signal is used to detect deformation of the first SMA wire, N times a pulse signal cycle is equal to a time difference between the first time of sampling and the second time of sampling in correlated double sampling CDS of the image sensor, and N is a positive integer.

The processor 2902 is configured to obtain current resolution information.

The processor 2902 is further configured to determine a first interval in each ADC cycle of the image sensor based on the current resolution information and a correspondence between the resolution information and the first interval, where the first interval corresponds to one time of CDS.

The processor 2902 is configured to output the detection signal in a first time other than the first interval in one ADC cycle.

Optionally, one analog-to-digital conversion ADC cycle of the image sensor corresponds to one time of CDS, a detection cycle of the detection signal is equal to a positive integer multiple of the ADC cycle, and one detection cycle corresponds to output of one detection signal.

Optionally, the processor 2902 is further configured to adjust a start time point of the detection cycle based on a synchronous signal output by the image sensor, so that a difference between the first time and a time for outputting the synchronous signal is equal to a preset value, a cycle of the synchronous signal is equal to a positive integer multiple of the ADC cycle, one ADC cycle of the image sensor corresponds to one time of CDS, and one detection cycle corresponds to output of one detection signal.

An embodiment of this application further provides a computer program storage medium. The computer program storage medium has program instructions, and when the program instructions are executed, the foregoing method is performed.

An embodiment of this application further provides a chip. The chip system includes at least one processor, and when program instructions are executed on the at least one processor, the foregoing method is performed.

A person of ordinary skill in the art may be aware that, in combination with units and algorithm steps of the examples described in the embodiments disclosed in this specification, this application may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units may be integrated into one unit.

When the functions are implemented in the form of a software functional unit and sold or used as an independent product, the functions may be stored in a computer-readable storage medium. Based on such an understanding, the technical solutions of this application essentially, or the part contributing to a current technology, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of this application. The foregoing storage medium includes various mediums that can store program code, such as a USB flash drive, a removable hard disk, a read-only memory (read-only memory, ROM), a random access memory (random access memory, RAM), a magnetic disk, or an optical disc, such as a static random access memory (static random access memory, SRAM), a flash memory (flash memory), or an electrically erasable programmable read only memory (electrically erasable programmable read only memory, EEPROM) in a camera module.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:
outputting, by a controller, a pulse signal, wherein the pulse signal comprises a drive signal and a detection signal, the detection signal comprises a first detection signal output in a first time and a second detection signal output in a second time, wherein the first time corresponds to a first time of sampling in correlated double sampling (CDS) of an image sensor, the second time corresponds to a second time of sampling in the CDS of the image sensor, and a pulse width of the second detection signal is equal to a pulse width of the first detection signal;

wherein a photographing apparatus comprises a shape memory alloy (SMA) motor, the image sensor, a lens, and the controller;

wherein the SMA motor comprises at least one SMA wire, configured to deform to drive the lens to move;

wherein the drive signal causes a first SMA wire in the at least one SMA wire to deform, and the detection signal is used to detect deformation of the first SMA wire; and wherein N times a pulse signal cycle of the pulse signal is equal to a time difference between the first time of sampling and the second time of sampling in the CDS of the image sensor, and N is a positive integer.

2. The method according to claim 1, wherein one analog-to-digital conversion (ADC) cycle of the image sensor corresponds to one sampling time of CDS, a detection cycle of the detection signal is equal to a positive integer multiple of the ADC cycle, and two detection signals are output by the controller in one detection cycle.

3. The method according to claim 1, comprising:

adjusting, by the controller, a start time point of a detection cycle of the detection signal based on a synchronous signal output by the image sensor, to set a difference between the first time and a time in which the synchronous signal is output to be a preset value, wherein a cycle of the synchronous signal is equal to a positive integer multiple of an analog-to-digital conversion (ADC) cycle of the image sensor, one ADC cycle of the image sensor corresponds to one sampling time of CDS, and two detection signals are output by the controller in one detection cycle of the detection signal.

4. A method comprising:

outputting, by a controller, a pulse signal, wherein a photographing apparatus comprises a shape memory alloy (SMA) motor, an image sensor, a lens, and the controller, wherein the SMA motor comprises at least one SMA wire, the at least one SMA wire is configured to deform to drive the lens to move, the pulse signal comprises a drive signal and a detection signal, the drive signal causes a first SMA wire in the at least one SMA wire to deform, and the detection signal is used to detect deformation of the first SMA wire; and wherein the detection signal comprises a first detection signal, a width of the first detection signal is equal to a width of the drive signal, the first detection signal is output in a preset time range before or after a first drive signal, the detection signal comprises the first detection signal, and the drive signal comprises the first drive signal; and wherein N times a pulse signal cycle of the pulse signal is equal to a time difference between a first time of sampling in correlated double sampling (CDS) of the image sensor and a second time of sampling in the CDS of the image sensor, and N is a positive integer.

5. The method according to claim 4, further comprising:

adjusting, by the controller, a start time point of a detection cycle of the detection signal based on a synchronous signal output by the image sensor, to set a difference between a time in which the first detection signal is output and a time in which the synchronous signal is output to be equal to a preset value, wherein a cycle of the synchronous signal is equal to a positive integer multiple of an analog-to-digital conversion (ADC) cycle of the image sensor, one ADC cycle of the image sensor corresponds to one sampling time of CDS, and the controller outputs one detection signal in one detection cycle.

6. An apparatus, comprising:

a shape memory alloy (SMA) motor;

an image sensor;

a lens; and a controller;

wherein the SMA motor comprises at least one SMA wire, and the at least one SMA wire is configured to deform to drive the lens to move;

wherein the controller is configured to:

output a pulse signal, wherein the pulse signal comprises a drive signal and a detection signal, the detection signal comprises a first detection signal output in a first time and a second detection signal output in a second time, the drive signal causes a first SMA wire in the at least one SMA wire to deform, the detection signal is used to detect deformation of the first SMA wire, a pulse width of the first detection signal is equal to a pulse width of the second detection signal, the first time corresponds to a first time of sampling in correlated double sampling (CDS) of the image sensor, and the second time corresponds to a second time of sampling in the CDS of the image sensor; and wherein N times a pulse signal cycle of the pulse signal is equal to a time difference between the first time of sampling and the second time of sampling in the CDS of the image sensor, and N is a positive integer.

7. The apparatus according to claim 6, wherein one analog-to-digital conversion (ADC) cycle of the image sensor corresponds to one sampling time of CDS, a detection cycle of the detection signal is equal to a positive integer multiple of the ADC cycle, and the controller outputs two detection signals in one detection cycle.

8. The apparatus according to claim 6, wherein the controller is further configured to:

adjust a start time point of a detection cycle of the detection signal based on a synchronous signal output by the image sensor, to set a difference between the first time and a time in which the synchronous signal is output to be equal to a preset value, wherein a cycle of the synchronous signal is equal to a positive integer multiple of an analog-to-digital conversion (ADC) cycle, one ADC cycle of the image sensor corresponds to one sampling time of CDS, and the controller outputs two detection signals in one detection cycle.

9. The method according to claim 1, wherein the drive signal, the first detection signal, and the second detection signal have a same pulse signal cycle as the pulse signal cycle of the pulse signal, wherein N is greater than 1, and wherein a time difference between the first detection signal and the second detection signal is equal to a CDS interval of the CDS such that magnetic interferences caused by the drive signal, the first detection signal, and the second detection signal to the image sensor are the same.

* * * * *